US008861001B2

(12) United States Patent
Sasaki

(10) Patent No.: US 8,861,001 B2
(45) Date of Patent: Oct. 14, 2014

(54) OUTPUT CONTROL SYSTEM, OUTPUT CONTROL METHOD, AND OUTPUT CONTROL APPARATUS FOR DETERMINING WHETHER TO STORE OR TRANSMIT TARGET DATA BASED ON USE STATE

(71) Applicant: Koji Sasaki, Kanagawa (JP)

(72) Inventor: Koji Sasaki, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 0 days.

(21) Appl. No.: 13/732,810

(22) Filed: Jan. 2, 2013

(65) Prior Publication Data

US 2013/0176592 A1 Jul. 11, 2013

(30) Foreign Application Priority Data

Jan. 6, 2012 (JP) ................................ 2012-001588

(51) Int. Cl.
*G06F 3/12* (2006.01)

(52) U.S. Cl.
CPC ............ *G06F 3/1296* (2013.01); *G06F 3/1267* (2013.01); *G06F 3/1222* (2013.01); *G06F 3/1288* (2013.01); *G06F 3/1238* (2013.01)
USPC ........................................................ 358/1.15

(58) Field of Classification Search
CPC ..................................................... G06F 3/1296
USPC ........................................................ 358/1.15
See application file for complete search history.

(56) References Cited

U.S. PATENT DOCUMENTS

2004/0179230 A1* 9/2004 Kitada et al. ................. 358/1.15
2007/0091349 A1* 4/2007 Yoshimura .................. 358/1.14

FOREIGN PATENT DOCUMENTS

JP 2007-166457 6/2007
JP 2010-064257 3/2010

* cited by examiner

*Primary Examiner* — Qian Yang
(74) *Attorney, Agent, or Firm* — Harness, Dickey & Pierce, P.L.C.

(57) ABSTRACT

An output control apparatus includes a state information storage unit configured to store therein state information in which apparatus identification information about an output apparatus and a use state of the output apparatus are associated; a use state management unit configured to store the state information for the use state received from the output apparatus in the state information storage unit; a designation of the output apparatus, and a request to output the target data to the designated output apparatus; an output control unit configured to determine whether to store the target data in a data storage unit or transmit the target data to the designated output apparatus based on the use state of the designated output apparatus; and a data transmitting unit configured to transmit the target data and the request to the designated output apparatus when the target data is to be transmitted to the designated output apparatus.

19 Claims, 16 Drawing Sheets

START
RECEIVE PRINT JOB FROM CLIENT TERMINAL APPARATUS — S21
IS USE STATE OF DESIGNATED MFP LOGIN STATE? — S22
YES → STORE PRINT JOB — S23
NO → TRANSMIT PRINT JOB TO MFP — S24
NOTIFY CLIENT TERMINAL APPARATUS OF CONTROL RESULT — S25
END

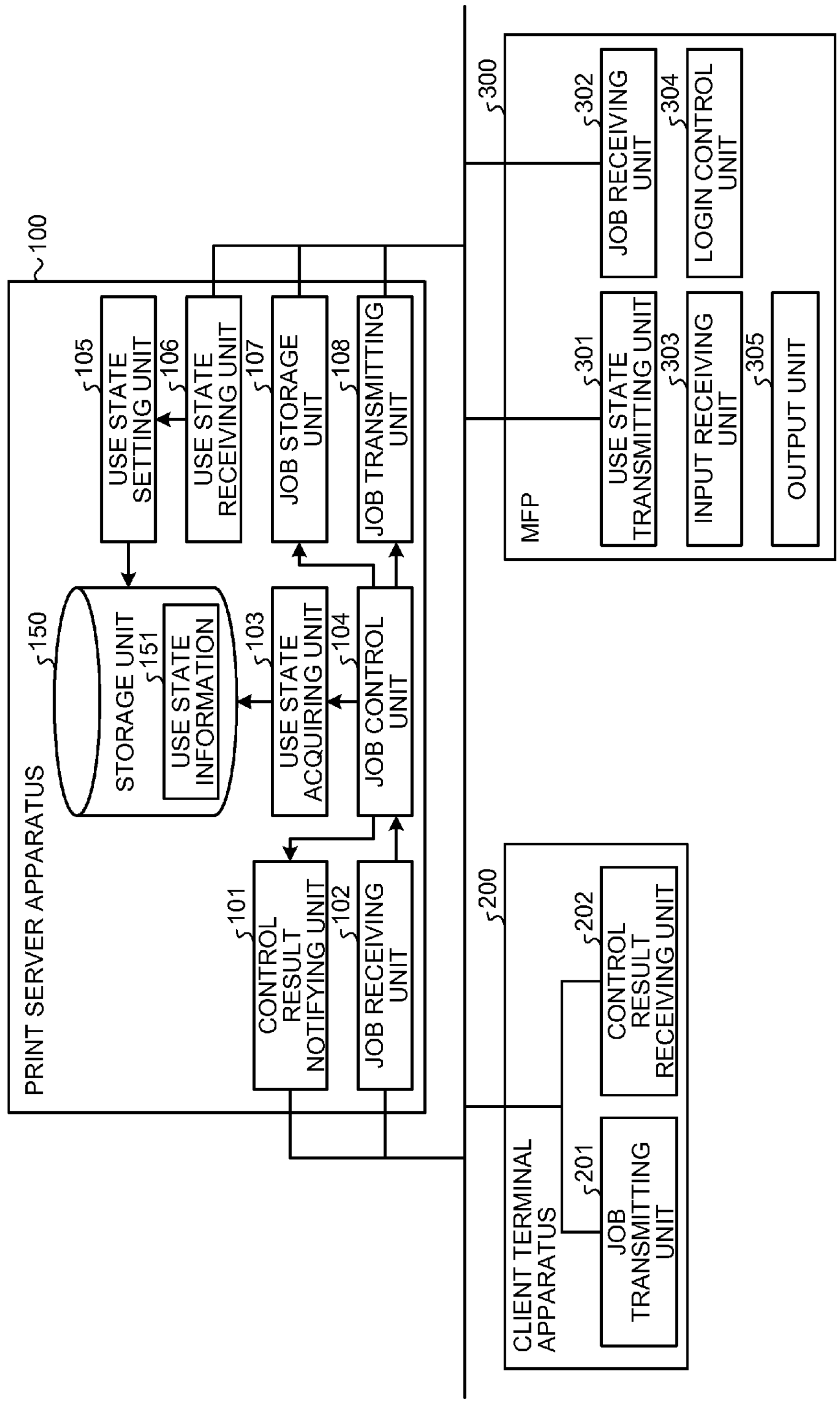
FIG.2
100
PRINT SERVER APPARATUS
101
CONTROL RESULT NOTIFYING UNIT
102
JOB RECEIVING UNIT
150
STORAGE UNIT
151
USE STATE INFORMATION
103
USE STATE ACQUIRING UNIT
104
JOB CONTROL UNIT
105
USE STATE SETTING UNIT
106
USE STATE RECEIVING UNIT
107
JOB STORAGE UNIT
108
JOB TRANSMITTING UNIT
200
CLIENT TERMINAL APPARATUS
201
JOB TRANSMITTING UNIT
202
CONTROL RESULT RECEIVING UNIT
300
MFP
301
USE STATE TRANSMITTING UNIT
302
JOB RECEIVING UNIT
303
INPUT RECEIVING UNIT
304
LOGIN CONTROL UNIT
305
OUTPUT UNIT

USE STATE INFORMATION
151

| APPARATUS NAME | UPDATE TIME | USE STATE | USER NAME |
|---|---|---|---|
| DeviceA | 2011/08/16 10:10:00 | LOGIN | User1 |
| DeviceB | 2011/08/16 09:30:00 | LOGOUT | |

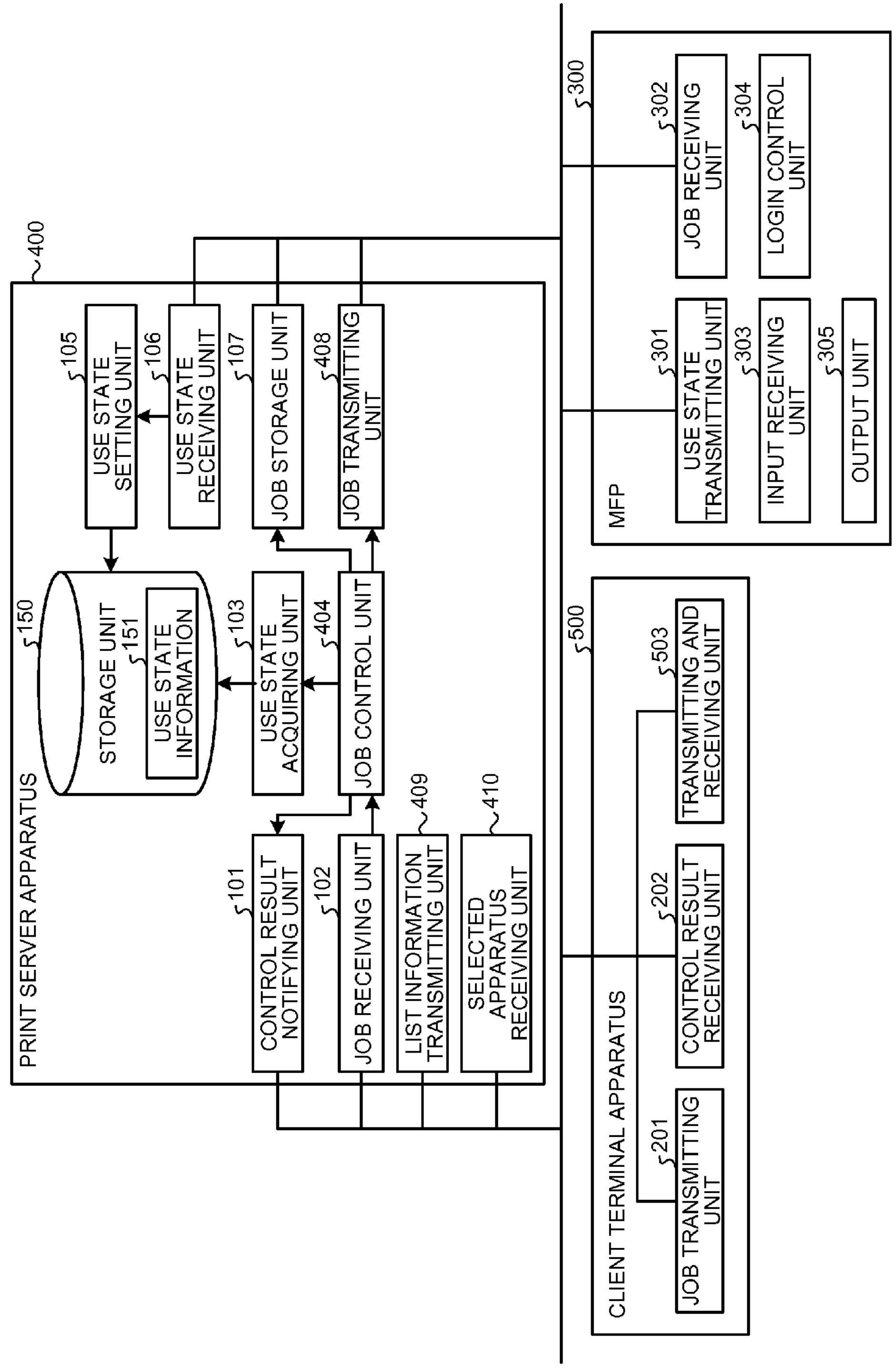
FIG.7
400
PRINT SERVER APPARATUS
105
USE STATE SETTING UNIT
106
USE STATE RECEIVING UNIT
107
JOB STORAGE UNIT
408
JOB TRANSMITTING UNIT
150
STORAGE UNIT
151
USE STATE INFORMATION
103
USE STATE ACQUIRING UNIT
404
JOB CONTROL UNIT
101
CONTROL RESULT NOTIFYING UNIT
102
JOB RECEIVING UNIT
409
LIST INFORMATION TRANSMITTING UNIT
410
SELECTED APPARATUS RECEIVING UNIT
300
MFP
301
USE STATE TRANSMITTING UNIT
302
JOB RECEIVING UNIT
303
INPUT RECEIVING UNIT
304
LOGIN CONTROL UNIT
305
OUTPUT UNIT
500
CLIENT TERMINAL APPARATUS
201
JOB TRANSMITTING UNIT
202
CONTROL RESULT RECEIVING UNIT
503
TRANSMITTING AND RECEIVING UNIT START
RECEIVE PRINT JOB FROM CLIENT TERMINAL APPARATUS
S31
IS USE STATE OF DESIGNATED MFP LOGIN STATE?
S32
YES
NO
IS THERE MFP WHOSE USE STATE IS LOGOUT STATE?
S33
YES
NO
TRANSMIT LIST OF MFP IN LOGOUT STATE
S35
RECEIVE MFP SELECTED BY USER
S36
STORE PRINT JOB
S34
TRANSMIT PRINT JOB TO MFP
S37
NOTIFY CLIENT TERMINAL APPARATUS OF CONTROL RESULT
S38
END

FIG.11

USE STATE INFORMATION
651

| APPARATUS NAME | UPDATE TIME | USE STATE | USER NAME |
|---|---|---|---|
| DeviceA | 2011/08/16 10:10:00 | LOGIN | User1 |
| DeviceB | 2011/08/16 09:30:00 | LOGOUT | |
| DeviceC | 2011/08/16 10:09:00 | DURING PRINTING | User2 |

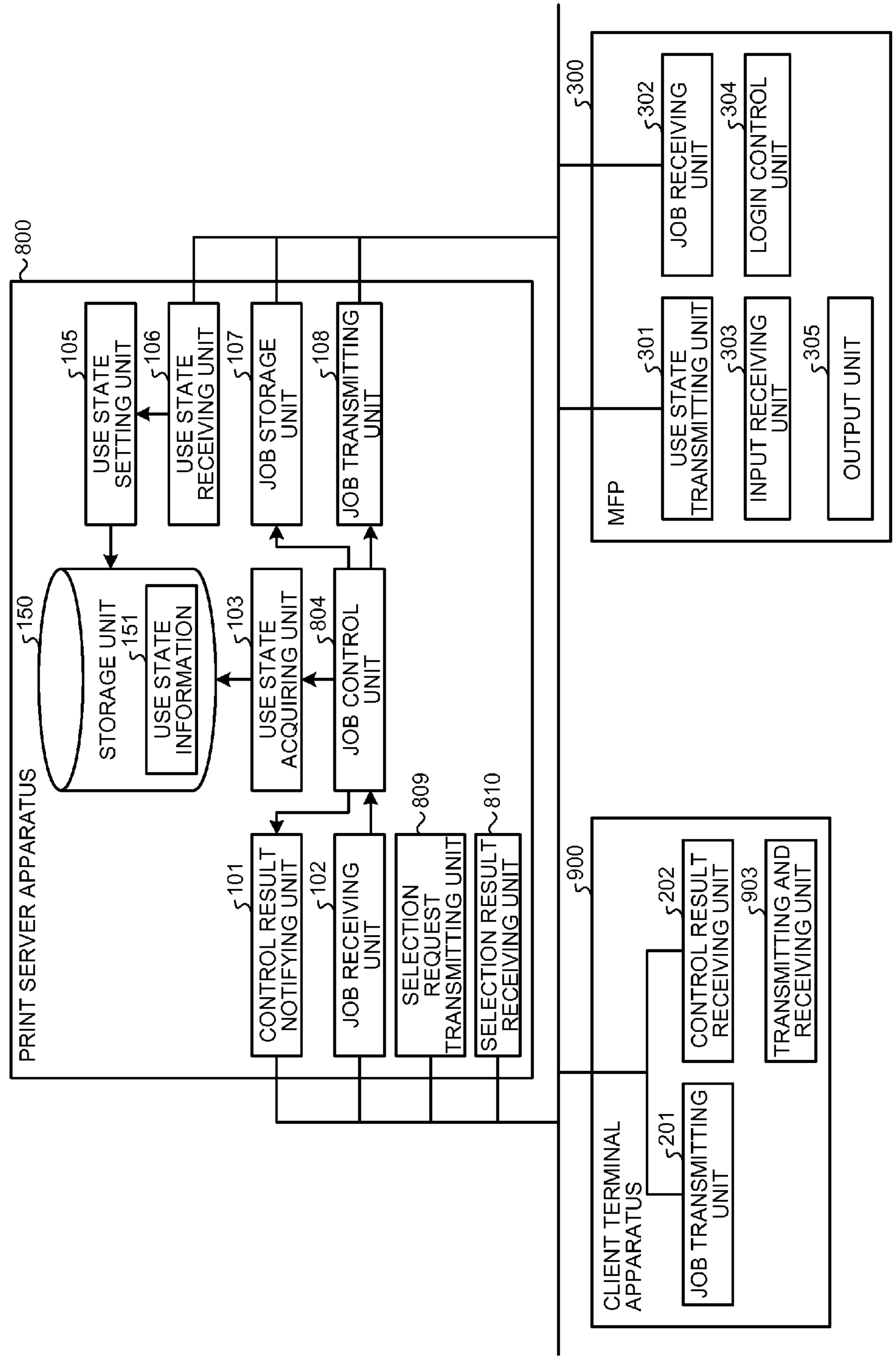
FIG.14
800
PRINT SERVER APPARATUS
150
STORAGE UNIT
151
USE STATE INFORMATION
105
USE STATE SETTING UNIT
106
USE STATE RECEIVING UNIT
107
JOB STORAGE UNIT
108
JOB TRANSMITTING UNIT
103
USE STATE ACQUIRING UNIT
804
JOB CONTROL UNIT
101
CONTROL RESULT NOTIFYING UNIT
102
JOB RECEIVING UNIT
809
SELECTION REQUEST TRANSMITTING UNIT
810
SELECTION RESULT RECEIVING UNIT
300
MFP
301
USE STATE TRANSMITTING UNIT
302
JOB RECEIVING UNIT
303
INPUT RECEIVING UNIT
304
LOGIN CONTROL UNIT
305
OUTPUT UNIT
900
CLIENT TERMINAL APPARATUS
201
JOB TRANSMITTING UNIT
202
CONTROL RESULT RECEIVING UNIT
903
TRANSMITTING AND RECEIVING UNIT

OUTPUT CONTROL SYSTEM, OUTPUT CONTROL METHOD, AND OUTPUT CONTROL APPARATUS FOR DETERMINING WHETHER TO STORE OR TRANSMIT TARGET DATA BASED ON USE STATE

CROSS-REFERENCE TO RELATED APPLICATION

The present application claims priority to and incorporates by reference the entire contents of Japanese Patent Application No. 2012-001588 filed in Japan on Jan. 6, 2012.

BACKGROUND OF THE INVENTION

1. Field of the Invention

The present invention relates to an output control system, an output control method, and an output control apparatus.

2. Description of the Related Art

There is a demand for a technique which is capable of improving security while considering convenience in a network printing environment in which a print job is transmitted from a client terminal apparatus, such as a personal computer (PC), to an image forming apparatus, such as a multifunction peripheral (MFP), through a network and is then printed. As a method of implementing the technique which is capable of improving security while considering convenience, for example, in general, a method has been known which performs switching between hold print in which a print job is stored and is then printed according to, for example, a user name, a print job, a PC name (client name), an apparatus name (the name of an image forming apparatus) and direct print in which printing starts immediately after a print job is received.

For example, an image output apparatus has been proposed which performs hold print when information added to print data corresponds to hold conditions and performs direct print when the information does not correspond to the hold conditions (see Japanese Patent Application Laid-open No. 2010-064257).

However, in the method according to the related art, it is determined whether the print mode is hold print or direct print on substantially fixed conditions, such as the user name, the PC name, and the apparatus name, as viewed from an end user. Therefore, it is difficult to flexibly change the print mode depending on operation conditions. Even in a situation in which the direct print can be performed, the hold print is forcibly performed. Even in a situation in which the hold print needs to be performed, the direct print is performed. Similarly, in Japanese Patent Application Laid-open No. 2010-064257, it is determined whether the print mode is hold print or direct print based on substantially fixed conditions, such as a file name and an IP address. Therefore, it is difficult to flexibly change the print mode depending on the operation conditions.

Therefore, there is a need for an output control system, an output control method, and an output control apparatus capable of improving security while maintaining convenience.

SUMMARY OF THE INVENTION

It is an object of the present invention to at least partially solve the problems in the conventional technology.

According to an embodiment, there is provided an output control system that includes an output apparatus; and an output control apparatus connected to the output apparatus through a network. The output apparatus includes an output unit configured to output target data; and a state transmitting unit configured to transmit a use state of the output apparatus to the output control apparatus. The output control apparatus includes a state information storage unit configured to store therein state information in which unique apparatus identification information about the output apparatus and the use state are associated with each other; a data storage unit configured to store therein the target data; a use state management unit configured to receive the use state from the output apparatus and store the state information in which the received use state and the apparatus identification information are associated with each other in the state information storage unit; a data receiving unit configured to receive the target data, a designation of the output apparatus that is an output destination, and a request to output the target data to the designated output apparatus from a terminal apparatus; an output control unit configured to determine whether to store the target data in the data storage unit or transmit the target data to the designated output apparatus in response to the request, on the basis of the use state corresponding to the apparatus identification information about the designated output apparatus with reference to the state information; and a data transmitting unit configured to transmit the target data and the request to the designated output apparatus when it is determined that the target data is to be transmitted to the designated output apparatus. The output control unit stores the target data in the data storage unit when it is determined that the target data is to be stored in the data storage unit.

According to another embodiment, there is provided an output control method performed in an output control system that includes an output apparatus and an output control apparatus connected to the output apparatus through a network, the output control apparatus including a state information storage unit configured to store therein state information in which unique apparatus identification information about the output apparatus and a use state of the output apparatus are associated with each other, and a data storage unit configured to store therein target data to be output by the output apparatus. The output control method includes transmitting the use state from the output apparatus to the output control apparatus; receiving the use state from the output apparatus; storing the state information in which the received use state and the apparatus identification information are associated with each other in the state information storage unit; receiving, by the output control apparatus, the target data, a designation of the output apparatus that is an output destination, and a request to output the target data to the designated output apparatus from a terminal apparatus; determining, by the output control apparatus, whether to store the target data in the data storage unit or transmit the target data to the designated output apparatus in response to the request, on the basis of the use state corresponding to the apparatus identification information about the designated output apparatus with reference to the state information; and transmitting the target data and the request to the designated output apparatus when it is determined that the target data is to be transmitted to the designated output apparatus. The target data is stored in the data storage unit when it is determined that the target data is to be stored in the data storage unit.

According to still another embodiment, there is provided an output control apparatus connected to an output apparatus that outputs target data through a network. The output control apparatus includes a state information storage unit configured to store therein state information in which unique apparatus identification information about the output apparatus and the use state are associated with each other; a data storage unit configured to store therein the target data; a use state management unit configured to receive the use state from the output apparatus and store the state information in which the received use state and the apparatus identification information are associated with each other in the state information storage unit; a data receiving unit configured to receive the target data, a designation of the output apparatus that is an output destination, and a request to output the target data to the designated output apparatus from a terminal apparatus; an output control unit configured to determine whether to store the target data in the data storage unit or transmit the target data to the designated output apparatus in response to the request, on the basis of the use state corresponding to the apparatus identification information about the designated output apparatus with reference to the state information; and a data transmitting unit configured to transmit the target data and the request to the designated output apparatus when it is determined that the target data is to be transmitted to the designated output apparatus. The output control unit stores the target data in the data storage unit when it is determined that the target data is to be stored in the data storage unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 2 is a block diagram illustrating the structure of each apparatus in the output control system according to the first embodiment;

FIG. 7 is a block diagram illustrating the structure of each apparatus in an output control system according to a second embodiment;

FIG. 11 is a diagram illustrating an example of use state information;

FIG. 14 is a block diagram illustrating the structure of each apparatus in an output control system according to a fifth embodiment;

DETAILED DESCRIPTION OF THE PREFERRED EMBODIMENTS

Exemplary embodiments according to the present invention will be described in detail below with reference to the accompanying drawings. In the following embodiments, an example in which the output apparatus is applied to a multifunction printer (MFP) having at least two of a copy function, a scanner function, a facsimile (FAX) function, and a printer (print) function will be described.

First Embodiment

Figure 1:
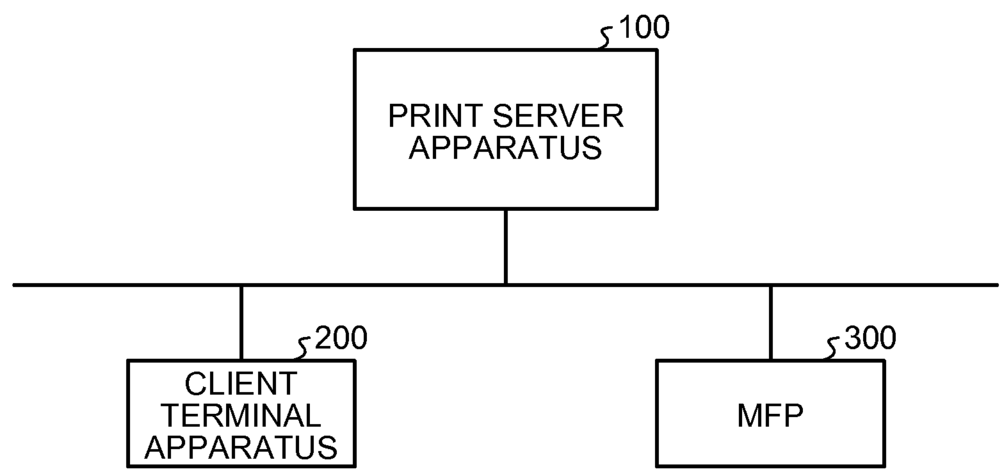
FIG. 1 is a diagram illustrating the overall structure of an output control system according to a first embodiment.

FIG. 1 is a diagram illustrating the overall structure of an output control system according to a first embodiment. As illustrated in FIG. 1, the output control system according to this embodiment includes a print server apparatus 100, a client terminal apparatus 200, and a multifunction peripheral (MFP) 300 which are connected so as to communicate with each other through a network such as a local area network (LAN). In FIG. 1, one MFP 300 is illustrated. However, it is assumed that a plurality of MFPs are connected to the LAN in a printing environment according to this embodiment. In addition, a plurality of client terminal apparatuses 200 may be connected.

The print server apparatus 100 is an apparatus in which print server applications operate, manages a print job including print data (output target data) and conditions for printing (outputting) the print data, and transmits the print job including the print data to a designate MFP such that the print data is printed. In this embodiment, an example in which the user designates the MFP 300 as an apparatus for printing the print data will be described.

The client terminal apparatus 200 is a terminal apparatus which is used by the user and transmits the print job including the print data to the print server apparatus 100 in response to a print request from the user. The client terminal apparatus 200 is, for example, a personal computer (PC) or a portable information terminal.

The MFP 300 is an image forming apparatus which can form (print the print data) an image on a recording medium, such as a recording sheet, based on the print job received from the print server apparatus 100.

Next, the functional structures of the print server apparatus 100, the client terminal apparatus 200, and the MFP 300 forming the output control system according to this embodiment will be described. FIG. 2 is a block diagram illustrating the structure of each apparatus in the output control system according to the first embodiment.

First, the structure of the print server apparatus 100 will be described. The print server apparatus 100 mainly includes a storage unit 150, a job storage unit 107, a use state receiving unit 106, a use state setting unit 105, a job receiving unit 102, a use state acquiring unit 103, a job control unit 104, a job transmitting unit 108, and a control result notifying unit 101.

The storage unit 150 is a storage medium, such as a hard disk drive (HDD) or a memory, which stores, for example, the unique apparatus name (apparatus identification information) of the MFP 300, the update time when the use state of the MFP 300 is updated, the use state of the MFP 300, and use state information 151 (state information) associated with the unique user name of the user. The use state includes "login" and "logout". When there is a user who logs in the MFP 300, that is, when the MFP 300 is in a login state, the use state is “login”. On the other hand, when there is no user who logs in the MFP 300, that is, when the MFP 300 is in a logout state, the use state is “logout”.

Figures 3, 4:
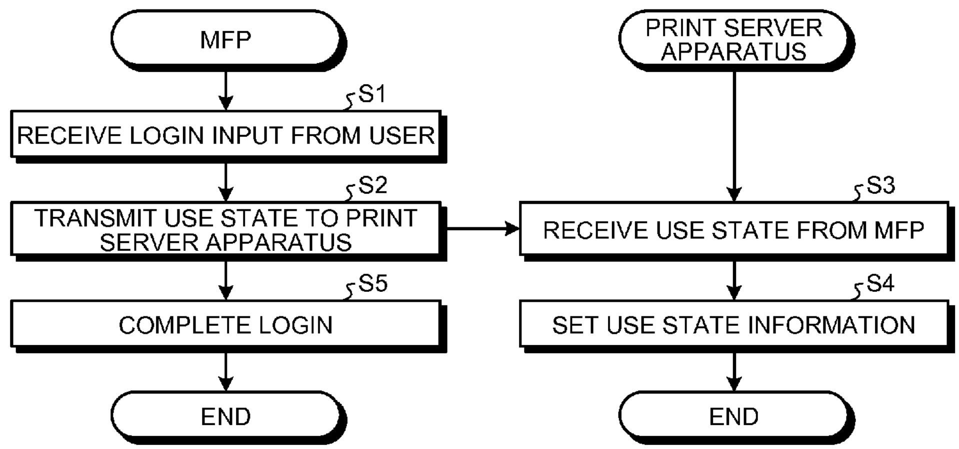
FIG. 3 is a diagram illustrating an example of use state information.
FIG. 4 is a flowchart illustrating the flow of a process when a login input is received from the user.

FIG. 3 is a diagram illustrating an example of the use state information. As illustrated in FIG. 3, the use state information 151 includes the apparatus names “DeviceA” and “DeviceB” of the MFPs 300, update times “2011/08/16 10:10:00” and “2011/08/16 09:30:00”, the use states “login” and “logout”, and a user name “User1” which are associated with each other.

The job storage unit 107 stores the print job received from the client terminal apparatus 200. In this embodiment, the print job includes, for example, print data to be printed by the MFP 300, information about the designation of a desired MFP 300 that prints the print data, a print data print request to the designated MFP 300, and a user name. The job storage unit 107 stores the print job when the designated MFP 300 is in the login state.

The use state receiving unit 106 receives the use state from the MFP 300. The use state setting unit 105 sets (stores) the use state information 151 in which the use state received from the MFP 300 and the apparatus name of the MFP 300 which has transmitted the use state are associated with each other to (in) the storage unit 150.

The job receiving unit 102 receives a print job from the client terminal apparatus 200. When the job receiving unit 102 receives a print job from the client terminal apparatus 200, the use state acquiring unit 103 acquires the use state of the designated MFP 300 from the use state information 151 stored in the storage unit 150 under the control of the job control unit 104, which will be described below.

The job control unit 104 determines a method of printing the print job from the user state acquired by the use state acquiring unit 103. Examples of the printing method include “hold print” in which the print job received from the client terminal apparatus 200 is stored in the job storage unit 107 and is then printed and “direct print” in which the print job including print data is transmitted to the designated MFP 300 and is then printed in respect to the print job print request.

Specifically, when the use state corresponding to the apparatus name of the designated MFP 300 is the login state with reference to the use state information 151 stored in the storage unit 150, that is, when authority to use the MFP 300 is given to another user, the job control unit 104 determines that another user is using the MFP 300 and stores the print job in the job storage unit 107. After the print job is stored in the job storage unit 107, the job control unit 104 prints the print data under predetermined conditions (hold print).

For example, when the print data which is stored in the job storage unit 107 is printed, the user moves to the desired MFP (for example, the designated MFP 300), logs in the MFP 300, and inquires about the user’s own print data which has been transmitted to the print server apparatus 100. In this way, the print data is printed. When the user searches for the transmitted user’s own print data, for example, the following method is considered: a “user name” is included in the print job transmitted from the client terminal apparatus 200, user information (“user name”) which is authorized by the user is transmitted from the MFP 300, and the user searches for the identical print data.

Returning to the process of determining the printing method, when the use state corresponding to the apparatus name of the designated MFP 300 is the logout state with reference to the use state information 151 stored in the storage unit 150, that is, when authority to use the MFP 300 is not given to another user, the job control unit 104 determines that another user does not use the MFP 300, and transmits the print job to the designated MFP 300 through the job transmitting unit 108 in response to the print request such that the print data is printed (direct print). When the use state of the designated MFP 300 is the login state and the user name of the print job is identical to the name of the user who logs in the MFP 300, the job control unit 104 may transmit the print job to the designated MFP 300 through the job transmitting unit 108 in response to the print request such that the print data is printed.

When the job control unit 104 determines to transmit the print job to the designated MFP 300 in response to the print request, the job transmitting unit 108 transmits the print job to the designated MFP 300. The control result notifying unit 101 notifies (transmits) the result of print control (hold print or direct print) which is performed according to the determination result of the printing method by the job control unit 104 as the control result of the print job to the client terminal apparatus 200.

Next, the client terminal apparatus 200 will be described. The client terminal apparatus 200 mainly includes a job transmitting unit 201 and a control result receiving unit 202.

The job transmitting unit 201 transmits a print job including, for example, print data, information about the designation of the MFP 300 received from the user, a print data print request to the designated MFP 300, and a user name to the print server apparatus 100.

The control result receiving unit 202 receives the control result of the print job transmitted from the print server apparatus 100 and stores the control result in a storage unit (not illustrated).

Next, the MFP 300 will be described. The MFP 300 mainly includes a use state transmitting unit 301, a job receiving unit 302, an input receiving unit 303, a login control unit 304, and an output unit 305.

When the user logs in the MFP 300, the input receiving unit 303 receives a login input including user identification information, such as a user ID or a user name. In addition, when the user logs out from the MFP 300, the input receiving unit 303 receives a logout input indicating the logout.

The login control unit 304 controls the authority of the user to use the MFP 300 based on the user identification information, such as the user ID or the user name, received from the user. That is, when the login input is received from the user and authentication succeeds, the login control unit 304 completes the login process. When the logout input received from the user, the login control unit 304 completes the logout process.

When the login input is received from the user or when the logout input is received from the user, the use state transmitting unit 301 transmits the use state (a use state indicating login or use information indicating logout) of the MFP 300 to the print server apparatus 100.

The job receiving unit 302 receives the print job transmitted from the print server apparatus 100. When the job receiving unit 302 receives a print job from the print server apparatus 100, the output unit 305 prints the print data included in the print job in response to the print request included in the received print job.

Next, the flow of the process of the MFP 300 and the print server apparatus 100 when a login input is received from the user will be described. FIG. 4 is a flowchart illustrating the flow of the process when a login input is received from the user.

First, when the input receiving unit 303 of the MFP 300 receives a login input from the user (Step S1), the use state transmitting unit 301 transmits a use state indicating login to the print server apparatus 100 (Step S2).

When the use state receiving unit 106 of the print server apparatus 100 receives the use state indicating login from the MFP 300 (Step S3), the use state setting unit 105 sets the use state information such that the received use state indicating login is associated with the apparatus name of the MFP 300 (Step S4).

After the use state is transmitted, the login control unit 304 of the MFP 300 performs user authentication. When the authentication succeeds, the login control unit 304 completes the login process (Step S5).

Figure 5:
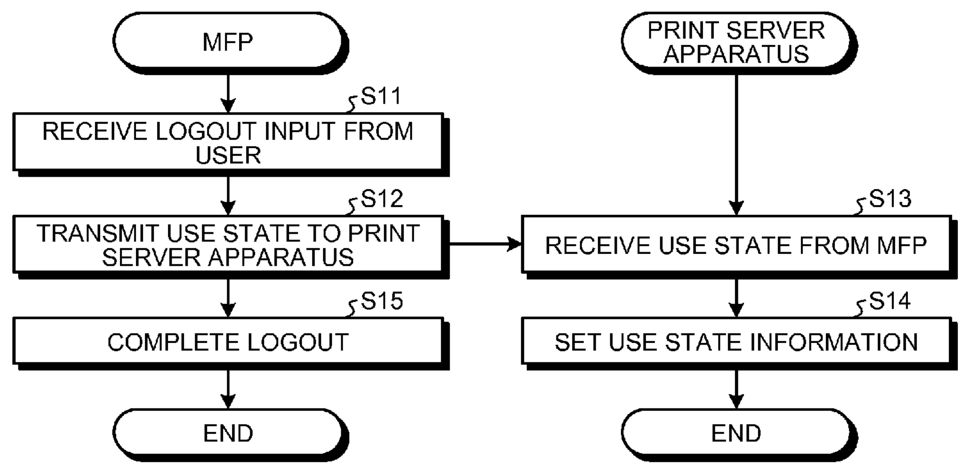
FIG. 5 is a flowchart illustrating the flow of a process when a logout input is received from the user.

Next, the flow of the process of the MFP 300 and the print server apparatus 100 when a logout input is received from the user will be described. FIG. 5 is a flowchart illustrating the flow of the process when a logout input is received from the user.

First, when the input receiving unit 303 of the MFP 300 receives a logout input from the user (Step S11), the use state transmitting unit 301 transmits the use state indicating logout to the print server apparatus 100 (Step S12).

When the use state receiving unit 106 of the print server apparatus 100 receives the use state indicating logout from the MFP 300 (Step S13), the use state setting unit 105 sets the use state information such that the received use state indicating logout is associated with the apparatus name of the MFP 300 (Step S14).

After the use state is transmitted, the login control unit 304 of the MFP 300 completes the logout process (Step S15).

Figure 6:
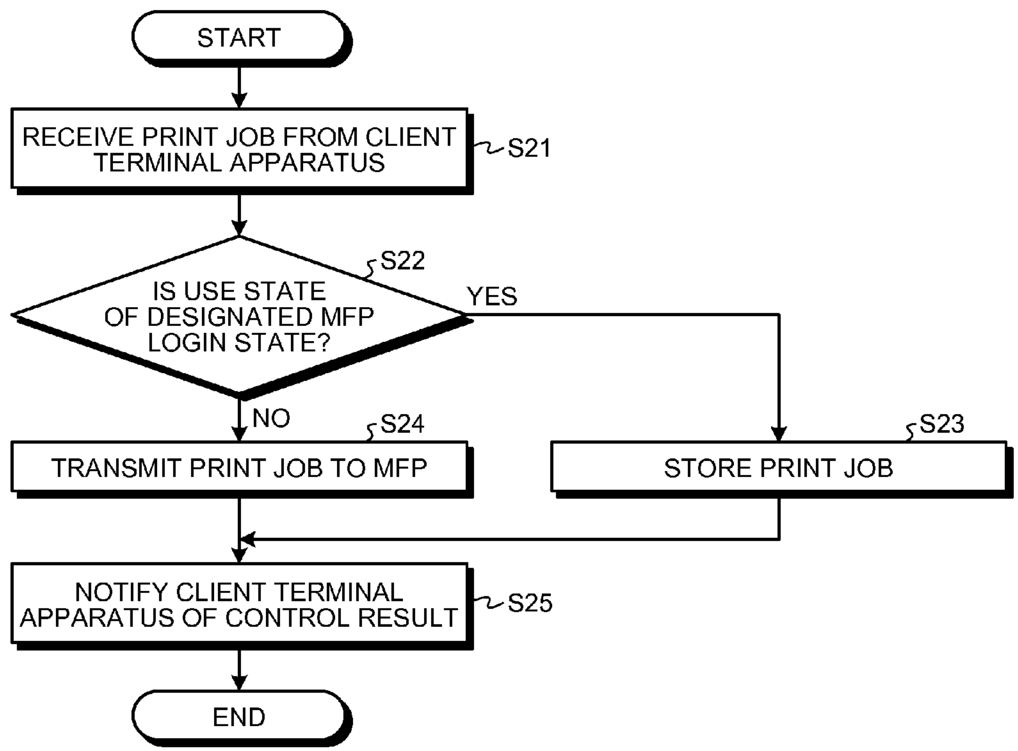
FIG. 6 is a flowchart illustrating the flow of the process of a print server apparatus when a print job is received.

Next, the flow of the process of the print server apparatus 100 when a print job is received from the client terminal apparatus 200 will be described. FIG. 6 is a flowchart illustrating the flow of the process of the print server apparatus when a print job is received. FIG. 6 illustrates a case in which the user designates the MFP 300 as an apparatus for printing print data, as described above.

First, the job receiving unit 102 receives a print job from the client terminal apparatus 200 (Step S21). Then, the job control unit 104 determines whether the use state of the MFP 300 designated in the print job is the login state with reference to the use state information 151 (Step S22). When the use state is the login state (Step S22: Yes), the job control unit 104 stores the print job in the job storage unit 107 (Step S23).

On the other hand, when the use state is not in the login state, that is, when the use state is the logout state (Step S22: No), the job control unit 104 transmits the print job to the designated MFP 300 through the job transmitting unit 108 (Step S24). Then, the control result notifying unit 101 notifies the result of print control by the job control unit 104 as the control result of the print job to the client terminal apparatus 200 (Step S25).

As such, in the output control system according to this embodiment, when a print job is received from the client terminal apparatus 200 and another user logs in the designated MFP 300, the print server apparatus 100 performs "hold print" in which the print job is stored in the job storage unit 107 and is then printed. On the other hand, when the use state of the MFP 300 is the logout state, the print server apparatus 100 performs "direct print" in which the print job is transmitted to the designated MFP 300 and is then printed. In this way, when another user is in the login state, the print data is not printed. Therefore, it is possible to improve security while maintaining convenience.

Second Embodiment

In the output control system according to the first embodiment, when a print job is received from the client terminal apparatus and another user logs in the designated MFP, the print server apparatus performs "hold print" in which the print job is stored in the job storage unit 107 and is then printed. In contrast, in an output control system according to this embodiment, when another user logs in the designated MFP, the print server apparatus searches for MFPs which are not in the login state and allows the user to select an MFP which will perform printing instead of the designated MFP from the searched MFPs.

Since the overall structure of the output control system according to this embodiment is the same as that of the output control system according to the first embodiment, the description thereof will not be repeated (see FIG. 1).

Next, the functional structures of a print server apparatus 400, a client terminal apparatus 500, and an MFP 300 forming the output control system according to this embodiment will be described. FIG. 7 is a block diagram illustrating the structure of each apparatus in the output control system according to the second embodiment. In this embodiment, since the MFP 300 has the same structure and function as that according to the first embodiment, the description thereof will not be repeated. In this embodiment, a case in which the user designates the MFP 300 as an apparatus for printing print data will be described.

First, the structure of the print server apparatus 400 will be described. The print server apparatus 400 mainly includes a storage unit 150, a job storage unit 107, a use state receiving unit 106, a use state setting unit 105, a job receiving unit 102, a use state acquiring unit 103, a job control unit 404, a job transmitting unit 408, a control result notifying unit 101, a list information transmitting unit 409, and a selected apparatus receiving unit 410. Since the use state receiving unit 106, the use state setting unit 105, the job receiving unit 102, the use state acquiring unit 103, and the control result notifying unit 101 have the same structure and function as those in the first embodiment, the description thereof will not be repeated.

The job control unit 404 determines a method of printing a print job from the use state acquired by the use state acquiring unit 103. The detailed determination method is the same as that in the first embodiment.

When the use state of the designated MFP 300 is a login state, that is, when authority to use the MFP 300 is given to another user, the job control unit 404 determines whether there is another MFP (another MFP to which no use authority is given) whose use state is a logout state, with reference to use state information 151 stored in the storage unit 150.

When the job control unit 404 determines that there is another MFP whose use state is the logout state, the list information transmitting unit 409 transmits list information, which is information about a list of other MFPs which are in the logout state, to the client terminal apparatus 500. When receiving the list information, the client terminal apparatus 500 allows the user to select an MFP which will print the print data instead of the designated MFP from the MFPs in the list information and transmits the selection result to the print server apparatus 400.

The selected apparatus receiving unit 410 receives information about another MFP which is selected as an apparatus for printing print data instead of the designated MFP by the user from the client terminal apparatus 500.

When the job control unit 404 determines to transmit the print job to the designated MFP 300 in response to a print request, the job transmitting unit 408 transmits the print job to the designated MFP 300. In addition, when the information about the selected MFP which will perform printing instead of the designated MFP is received, the job transmitting unit 408 transmits the print job to the selected MFP in response to the print request of the print job.

Next, the client terminal apparatus 500 will be described. The client terminal apparatus 500 mainly includes a job transmitting unit 201, a control result receiving unit 202, and a transmitting and receiving unit 503. In this embodiment, since the job transmitting unit 201 and the control result receiving unit 202 have the same structure and function as those in the first embodiment, the description thereof will not be repeated.

The job transmitting unit 201 transmits a print job to the print server apparatus 400. When the use state of the designated MFP 300 is a login state, the transmitting and receiving unit 503 receives information about a list of the MFPs whose use state is a logout state from the print server apparatus 400. Then, the client terminal apparatus 500 allows the user to select the MFP which will print the print data instead of the designated MFP from the MFPs in the list information and the transmitting and receiving unit 503 transmits information about the MFP which is selected by the user to the print server apparatus 400.

In this embodiment, the flow of a process of receiving a login input from the user and the flow of a process of receiving a logout input from the user are the same as those in the first embodiment and thus the description thereof will not be repeated (see FIGS. 4 and 5).

Figure 8:
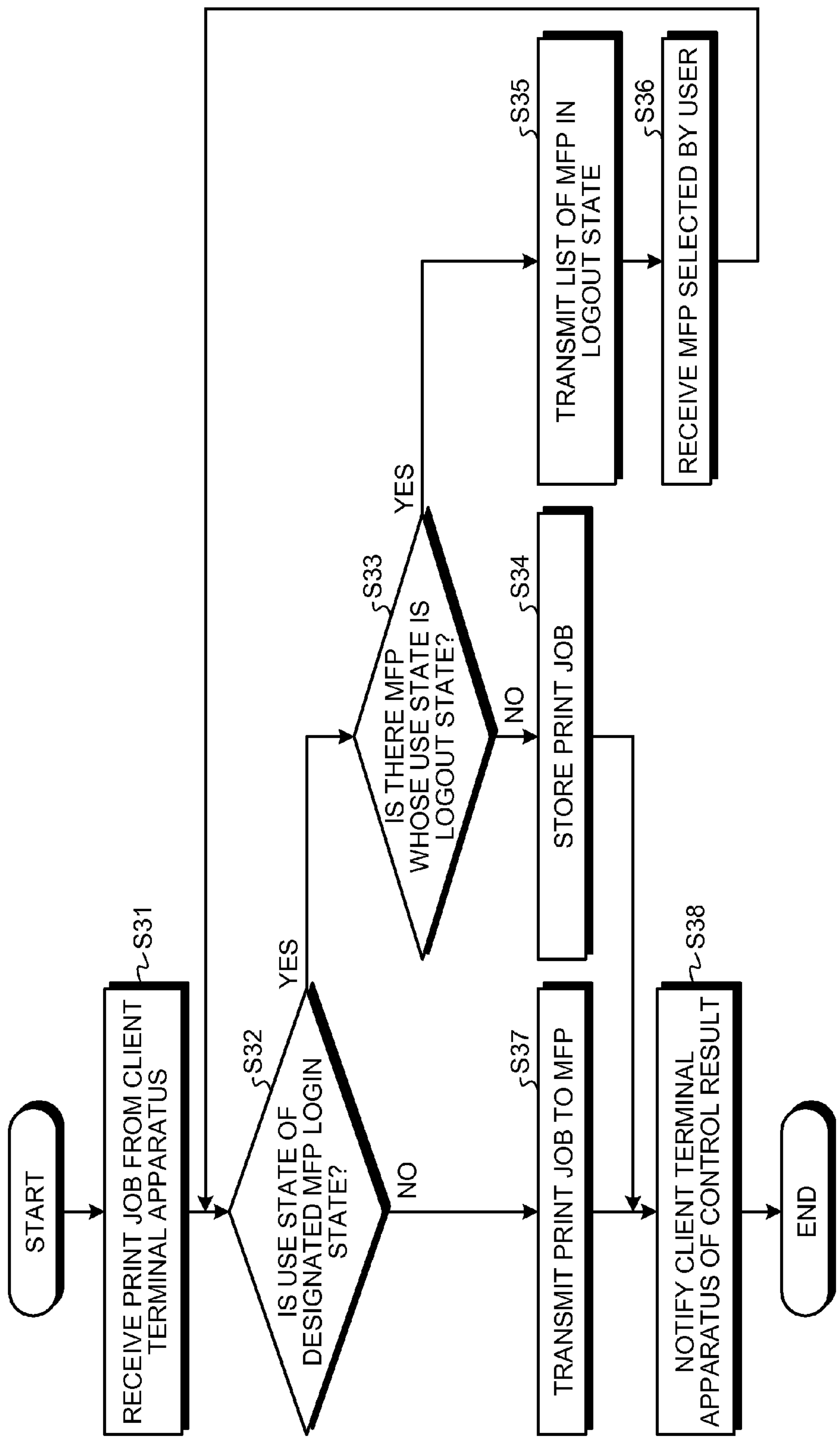
FIG. 8 is a flowchart illustrating the flow of the process of a print server apparatus when a print job is received.

Next, the flow of the process of the print server apparatus 400 when a print job is received from the client terminal apparatus 500 will be described. FIG. 8 is a flowchart illustrating the flow of the process of the print server apparatus when a print job is received. FIG. 8 illustrates a case in which the user designates the MFP 300 as an apparatus for printing print data.

First, the job receiving unit 102 receives a print job from the client terminal apparatus 500 (Step S31). Then, the job control unit 404 determines whether the use state of the MFP 300 designated in the print job is a login state with reference to the use state information 151 (Step S32). When the use state is the login state (Step S32: Yes), the job control unit 404 determines whether there are other MFPs whose use state is a logout state with reference to the use state information 151 (Step S33).

When there is no another MFP whose use state is the logout state (Step S33: No), the job control unit 404 stores the print job in the job storage unit 107 (Step S34). On the other hand, when there is another MFP whose use state is the logout state (Step S33: Yes), the list information transmitting unit 409 transmits information about a list of the MFPs which are in the logout state to the client terminal apparatus 500 (Step S35).

Then, the selected apparatus receiving unit 410 receives information about the MFP which is selected as an apparatus for printing the print data instead of the designated MFP by the user from the client terminal apparatus 500 (Step S36), the process returns to Step S32. In this case, the process is performed using the selected MFP as the designated MFP.

When it is determined in Step S32 that the use state of the designated MFP 300 is not the login state, that is, the use state of the designated MFP 300 is the logout state (Step S32: No), the job control unit 404 transmits the print job to the designated MFP 300 through the job transmitting unit 408 (Step S37). Then, the control result notifying unit 101 notifies the client terminal apparatus 500 of the result of print control by the job control unit 404 as the control result of the print job to (Step S38).

As such, in the output control system according to this embodiment, when the print job is received from the client terminal apparatus 500, another user logs in the designated MFP 300, and there is no another MFP which is in the logout state, the print server apparatus 400 performs "hold print" in which the print job is stored in the job storage unit 107 and is then printed. On the other hand, when the use state of the MFP 300 is the logout state, the print server apparatus 400 performs "direct print" in which the print job is transmitted to the designated MFP 300 and is then printed. In this way, when another user is in a login state, print data is not printed. Therefore, it is possible to improve security while maintaining convenience.

In the output control system according to this embodiment, when a print job is received from the client terminal apparatus 500, another user logs in the designated MFP 300, and there are other MFPs which are in the logout state, the print server apparatus 400 allows the user to select one of the MFPs which will print the print data instead of the designated MFP and performs printing. In this way, when there is an apparatus (MFP) which can perform alternative printing in the vicinity of the user, the user can select alternative printing, which makes it possible to further improve convenience.

Third Embodiment

In the output control system according to the first embodiment, when the logout input is received from the user, the MFP transmits its use state to the print server apparatus. In contrast, in an output control system according to this embodiment, when the MFP receives the logout input from the user and has completed the printing of the print data, it transmits its use state to the print server apparatus.

In this embodiment, the output control system has the same overall structure as that in the first embodiment and a print server apparatus 100 and a client terminal apparatus 200 have the same structure and function as those in the first embodiment. Therefore, the description thereof will not be repeated (see FIGS. 1 and 2). In addition, in this embodiment, an MFP 300 has the same structure as that in the first embodiment except that a use state transmitting unit 301 has the following functions.

When the use state of the MFP 300 is changed, the use state transmitting unit 301 transmits the changed use state to the print server apparatus 100. That is, when the MFP 300 which is in a login state receives a logout input from the user and an output unit 305 has completed the printing of print data, the use state transmitting unit 301 transmits the use state (use information indicating logout) of the MFP 300 to the print server apparatus 100.

In this embodiment, since the flow of a process of receiving a login input from the user and the flow of the process of the print server apparatus when a print job is received from the client terminal apparatus are the same as those in the first embodiment, the description thereof will not be repeated (see FIGS. 4 and 6).

Figure 9:
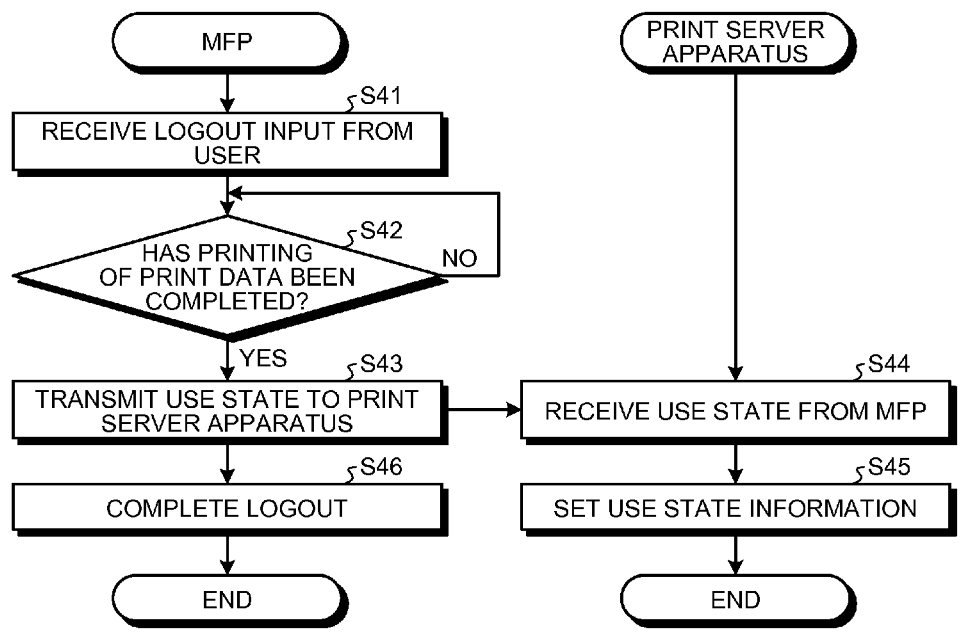
FIG. 9 is a flowchart illustrating the flow of a process when a logout input is received from the user.

Next, the flow of the process of the MFP 300 and the print server apparatus 100 when a logout input is received from the user will be described. FIG. 9 is a flowchart illustrating the flow of the process when the logout input is received from the user.

First, when an input receiving unit 303 of the MFP 300 receives a logout input from the user (Step S41), the use state transmitting unit 301 determines whether the printing of print data by the output unit 305 has been completed (Step S42). When the printing of the print data has not been completed (Step S42: No), the use state transmitting unit 301 stands by until the printing of the print data is completed.

On the other hand, when the printing of the print data has been completed (Step S42: Yes), the use state transmitting unit 301 transmits the use state indicating logout to the print server apparatus 100 (Step S43). Since a process from the reception of the use state to the completion of logout (Steps S44 to S46) is the same as that in the first embodiment, the description thereof will not be repeated (see Steps S13 to S15 in FIG. 5).

As such, in the output control system according to this embodiment, when a print job is received from the client terminal apparatus 200 and another user logs in the designated MFP 300, the print server apparatus 100 performs "hold print" in which the print job is stored in the job storage unit 107 and is then printed. On the other hand, when the use state of the MFP 300 is a logout state, the print server apparatus 100 performs "direct print" in which the print job is transmitted to the designated MFP 300 and is then printed. In this way, while another user is in a login state, print data is not printed. Therefore, it is possible improve security while maintaining convenience.

In the output control system, when hold print is performed, the user is likely to log out from the MFP without waiting for the completion of printing. In this case, the use state is the logout state. However, in practice, it is considered that the user is likely to wait for the completion of printing in the vicinity of the MFP 300. In the output control system according to this embodiment, when the MFP 300 receives a logout input from the user, but the printing of the print data has not been completed, the use state is not transmitted to the print server apparatus 100. That is, when a logout input is received from the user and the printing of the print data has been completed, the MFP 300 transmits the use state to the print server apparatus 100. In this way, after the printing state of the MFP 300 is monitored, the print mode is changed to direct print or hold print. Therefore, it is possible to further improve security.

Fourth Embodiment

In the output control system according to the first embodiment, when the print server apparatus receives a print job from the client terminal apparatus and the use state of the designated MFP is the logout state, the print server apparatus performs "direct print" in which the print job is transmitted to the designated MFP and is then printed. In contrast, in an output control system according to this embodiment, when the use state of the designated MFP is the logout state, the print server apparatus sets the use state to "during printing" and performs "direct print" in which the print job is transmitted to the designated MFP and is then printed. Thereafter, the print server apparatus inquires the MFP about the use state. When a response indicating the completion of printing is received, the print server apparatus sets the use state to the logout state.

In the output control system according to the first embodiment, when the login input is received from the user, the MFP transmits its use state to the print server apparatus. In contrast, in the output control system according to this embodiment, when the MFP receives the login input from the user, but is printing print data, it rejects the login and does not transmit its use state to the print server apparatus.

Since the overall structure of the output control system according to this embodiment is the same as that of the output control system according to the first embodiment, the description of will not be repeated (see FIG. 1).

Figure 10:
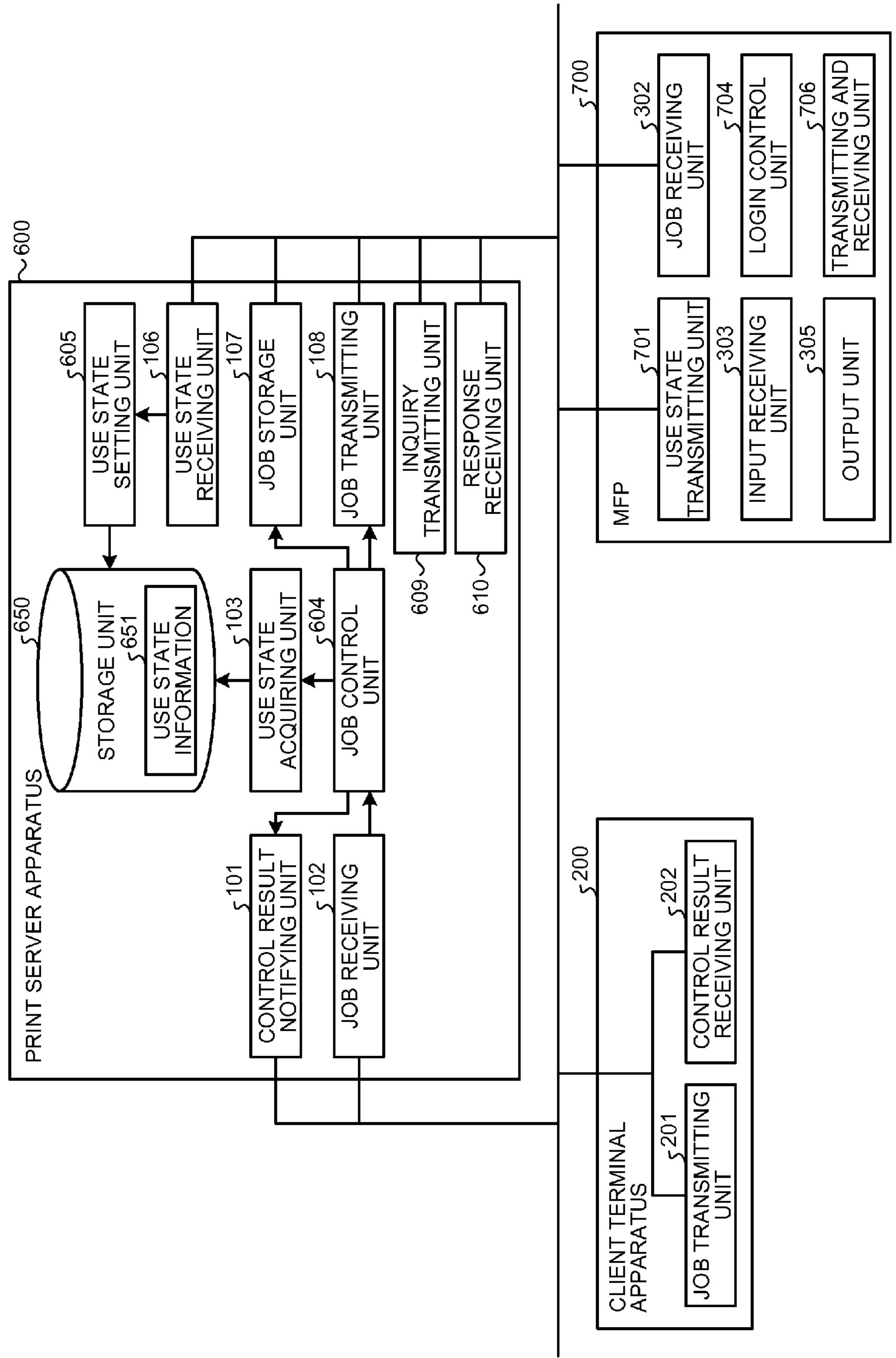
FIG. 10 is a block diagram illustrating the structure of each apparatus in an output control system according to a fourth embodiment.

Next, the functional structures of a print server apparatus 600, a client terminal apparatus 200, and an MFP 700 forming the output control system according to this embodiment will be described. FIG. 10 is a block diagram illustrating the structure of each apparatus in the output control system according to the fourth embodiment. In this embodiment, since the client terminal apparatus 200 has the same structure and function as that in the first embodiment, the description thereof will not be repeated. In addition, in this embodiment, a case in which the user designates the MFP 700 as an apparatus for printing print data will be described.

First, the structure of the print server apparatus 600 will be described. The print server apparatus 600 mainly includes a storage unit 650, a job storage unit 107, a use state receiving unit 106, a use state setting unit 605, a job receiving unit 102, a use state acquiring unit 103, a job control unit 604, a job transmitting unit 108, a control result notifying unit 101, an inquiry transmitting unit 609, and a response receiving unit 610. In this embodiment, since the job storage unit 107, the use state receiving unit 106, the job receiving unit 102, the use state acquiring unit 103, the job transmitting unit 108, and the control result notifying unit 101 have the same structures and functions as those in the first embodiment, the description thereof will not be repeated.

The storage unit 650 is a storage medium, such as a hard disk drive (HDD) or a memory, which stores, for example, the unique apparatus name (apparatus identification information) of the MFP 700, the update time when the use state of the MFP 700 is updated, the use state of the MFP 700, and use state information 651 (state information) associated with the unique user name of the user. The use state includes "login", "logout", and "during printing". In this embodiment, the login state and the logout state are the same as those in the first embodiment. The term "during printing" means that the MFP 700 is printing print data.

FIG. 11 is a diagram illustrating an example of the use state information. As illustrated in FIG. 11, the use state information 651 includes the apparatus names "DeviceA", "DeviceB", and "DeviceC" of the MFPs 700, update times "2011/08/16 10:10:00", "2011/08/16 09:30:00", and "2011/08/16 10:09:00", the use states "login" and "logout", and user names "User1" and "User2", which are associated with each other.

The job control unit 604 determines a print job printing method from the use state acquired by the use state acquiring unit 103. The detailed determination method is the same as that in the first embodiment.

In addition, when the use state corresponding to the apparatus name of the designated MFP 700 is "during printing" with reference to the use state information 651 stored in the storage unit 650, the job control unit 604 determines that another user performs printing using the MFP 700 and stores the print job in the job storage unit 107. After the print job is stored in the job storage unit 107, the job control unit 604 prints the print job under predetermined conditions (hold print).

The use state setting unit 605 sets (stores) the use state information 651 in which the use state received from the MFP 700 and the apparatus name of the MFP 700 which has transmitted the use state are associated with each other to (in) the storage unit 650. In addition, when the job transmitting unit 108 transmits the print job to the designated MFP 700 in response to a print request, the use state setting unit 605 sets (stores) the use state information 651 in which the use state indicating that the MFP 700 is printing the print data and the apparatus name of the designated MFP 700 are associated with each other to (in) the storage unit 650.

After the job control unit 104 transmits the print job to the designated MFP 700 in response to the print request, the inquiry transmitting unit 609 transmits an inquiry about the use state of the designated MFP 700. After the inquiry transmitting unit 609 transmits the inquiry to the designated MFP 700, the response receiving unit 610 receives a response to the transmitted inquiry, that is, a response indicating that the print data is being printed or a response indicating the completion of printing.

When the response receiving unit 610 receives the response indicating the completion of printing from the designated MFP 700, the use state setting unit 605 sets (stores) the use state information 651 in which the use state indicating that the MFP 700 is in the logout state and the apparatus name of the designated MFP 700 are associated with each other to (in) the storage unit 650.

Next, the MFP 700 will be described. The MFP 700 mainly includes a use state transmitting unit 701, a job receiving unit 302, an input receiving unit 303, a login control unit 704, an output unit 305, and a transmitting and receiving unit 706. In this embodiment, since the job receiving unit 302, the input receiving unit 303, and the output unit 305 have the same structure and function as those in the first embodiment, the description thereof will not be repeated.

The login control unit 704 controls the authority of the user to use the MFP 700 based on user identification information, such as the user ID received from the user. That is, a login input is received from the user and authentication is performed. When the authentication succeeds, the login control unit 704 completes the login. In addition, when a logout input is received from the user, the login control unit 704 completes the logout. The login control unit 704 checks the use state of the MFP 700 through the print server apparatus 600. When the use state in the use state information 651 is "during printing", the login control unit 704 rejects the login of the user who inputs login information (does not give authority to use the MFP).

When a login input is received from the user or when a logout input is received from the user, the use state transmitting unit 701 transmits the use state (a use state indicating login or use information indicating logout) of the MFP 700 to the print server apparatus 600. In addition, when the use state in the use state information 651 is "during printing" and the login control unit 704 rejects the login of the user who inputs login information (when the use authority is not given), the use state transmitting unit 701 does not transmit the use state to the print server apparatus 600.

After a print job is received from the print server apparatus 600, the transmitting and receiving unit 706 receives an inquiry about the use state of the MFP 700. When the inquiry is received and the printing of print data by the output unit 305 has been completed, the transmitting and receiving unit 706 transmits a response indicating that print data is being printed or a response indicating the completion of printing as a response to the inquiry to the print server apparatus 600.

Figure 12:
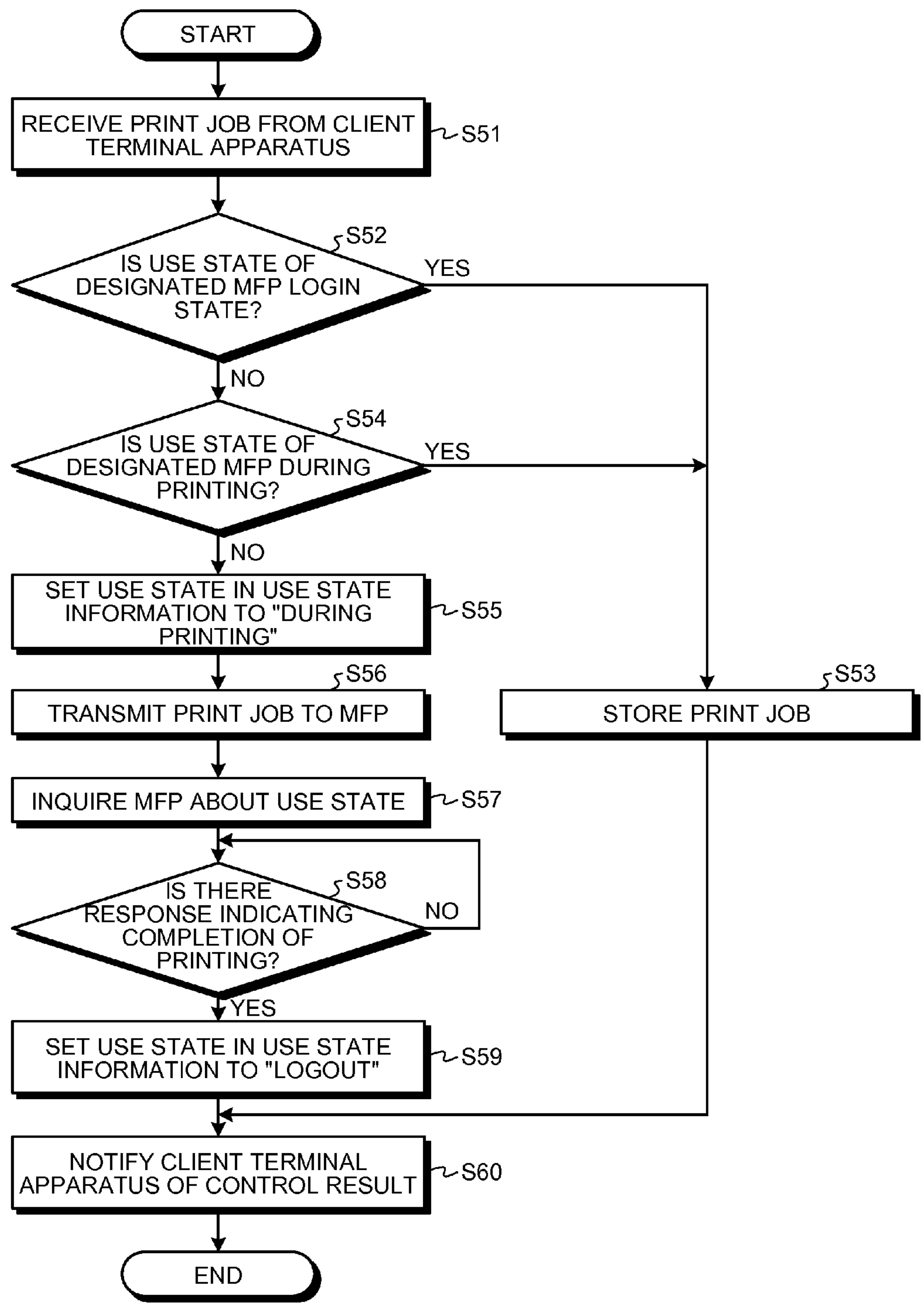
FIG. 12 is a flowchart illustrating the flow of the process of a print server apparatus when a print job is received.

Next, the flow of the process of the print server apparatus 600 when a print job is received from the client terminal apparatus 200 will be described. FIG. 12 is a flowchart illustrating the flow of the process of the print server apparatus when a print job is received. FIG. 12 illustrates a case in which the user designates the MFP 700 as an apparatus for printing print data.

A process from the reception of the print job to the storage of the print job (Steps S51 to S53) is the same as that in the first embodiment (see Steps S21 to S23 in FIG. 6).

In Step S52, when the use state of the designated MFP 700 is not in the login state, that is, the use state of the designated MFP 700 is "during printing" or the logout state (Step S52: No), the job control unit 604 determines whether the use state of the designated MFP 700 is "during printing" in the print job with reference to the use state information 651 (Step S54). When the use state of the designated MFP 700 is "during printing" (Step S54: Yes), the job control unit 604 stores the print job in the job storage unit 107 (Step S53).

On the other hand, when the use state of the designated MFP 700 is not "during printing", that is, when the use state of the designated MFP 700 is the logout state (Step S54: No), the use state setting unit 605 sets (stores) the use state of the use state information 651 stored in the storage unit 650 to (in) "during printing" indicating that the MFP 700 is printing print data (Step S55).

Then, the job control unit 604 transmits the print job to the designated MFP 700 through the job transmitting unit 108 (Step S56).

Then, the inquiry transmitting unit 609 transmits an inquiry about the use state of the designated MFP 700 (Step S57). Then, the use state setting unit 605 determines whether the response receiving unit 610 receives a response indicating the completion of printing as a response to the inquiry (Step S58).

When the response indicating the completion of printing is not received (Step S58: No), the use state setting unit 605 stands by until the response is received. On the other hand, when the response indicating the completion of printing is received (Step S58: Yes), the use state setting unit 605 sets the use state of the use state information 651 to "logout" (Step S59).

Then, the control result notifying unit 101 notifies the client terminal apparatus 200 of the result of print control by the job control unit 604 as the control result of the print job (Step S60).

Figure 13:
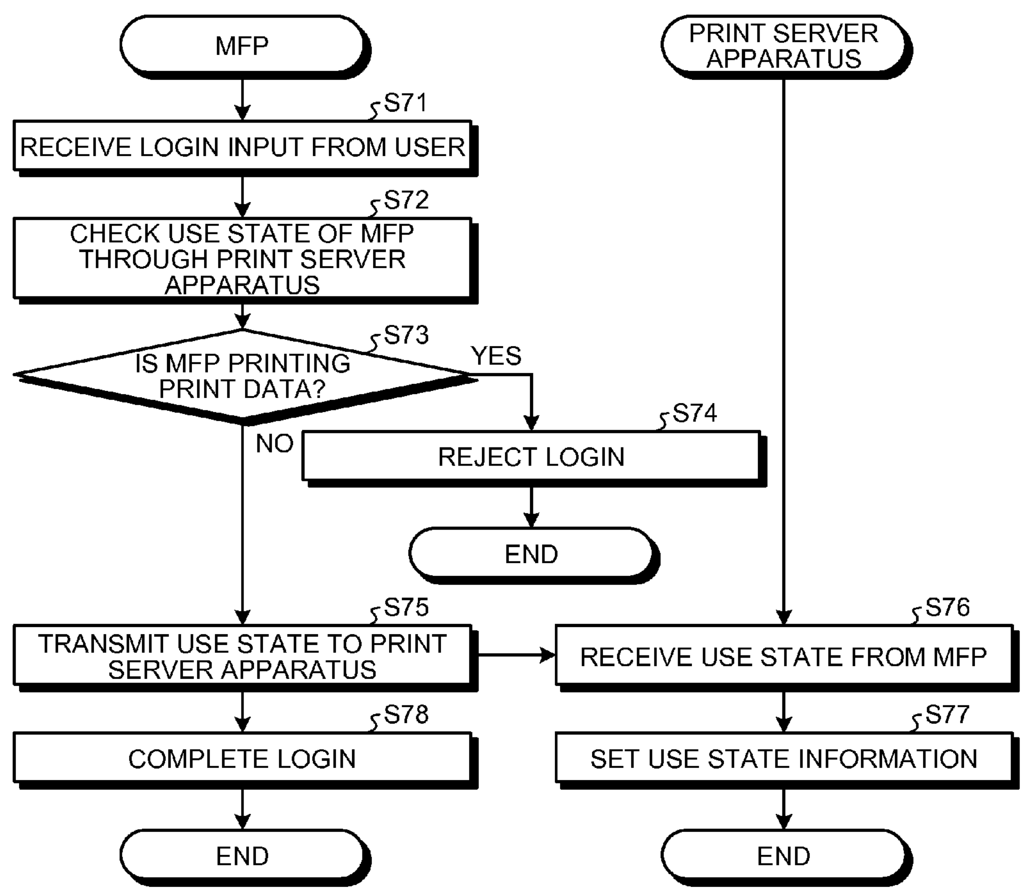
FIG. 13 is a flowchart illustrating the flow of a process when a login input is received from the user.

Next, the flow of the process of the MFP 700 and the print server apparatus 600 when a login input is received from the user will be described. FIG. 13 is a flowchart illustrating the flow of the process when a login input is received from the user.

First, when the input receiving unit 303 of the MFP 700 receives a login input from the user (Step S71), the login control unit 704 checks the use state of the MFP 700 through the print server apparatus 600 (Step S72) and determines whether the use state of the use state information 651 is "during printing" (Step S73).

When the use state is "during printing" (Step S73: Yes), the login control unit 704 rejects the login of the user who inputs login information (Step S74) and ends the process. Then, when the login control unit 704 rejects the login of the user who inputs login information, the use state transmitting unit 701 does not transmit the use state to the print server apparatus 600.

On the other hand, when the use state is not "during printing" (Step S73: No), the use state transmitting unit 701 transmits the use state indicating the login to the print server apparatus 600 (Step S75). Since a process (Steps S76 to S78) from the reception of the use state to the completion of login is the same as that in the first embodiment, the description thereof will not be repeated (see Steps S3 to S5 in FIG. 4).

Since the flow of a process of receiving the logout input from the user is the same as that in the first embodiment, the description thereof will not be repeated (see FIG. 5).

In this embodiment, the print server apparatus 600 transmits a print job to the MFP 700 and inquires the use state of the MFP 700. When a response indicating the completion of printing is received, the use state of the use state information 651 is set to logout (see FIG. 12). However, for example, the following two methods may be applied as a method of updating the use state in the use state information from "during printing" to "logout".

In the first method, even when the print server apparatus 600 does not inquire the use state, the MFP 700 notifies the print server apparatus 600 of the completion of printing. That is, when the MFP 700 receives a print job, prints print data, and completes the printing of the print data, it transmits information indicating the completion of printing to the print server apparatus 600. When receiving the information indicating the completion of printing, the print server apparatus 600 sets the use state of the use state information to logout.

In the second method, the print server apparatus 600 transmits a print job to the MFP 700 and sets the use state in the use state information to logout after a predetermined period of time has elapsed. The predetermined period of time may be set to a predetermined value. Since the print time varies depending on the number of print pages of print data, the predetermined period of time may be set according to the number of print pages.

As such, in the output control system according to this embodiment, when a print job is received from the client terminal apparatus 200 and another user logs in the designated MFP 700 or the designated MFP 700 is printing print data, the print server apparatus 600 performs "hold print" in which the print job is stored in the job storage unit 107 and is then printed. On the other hand, when the use state of the MFP 700 is the logout state, the print server apparatus 600 performs "direct print" in which the print job is transmitted to the designated MFP 700 and is then printed. In this way, when another user logs in the designated MFP or during printing, print data is not printed. Therefore, it is possible to improve security while maintaining convenience.

In addition, in the output control system according to this embodiment, when the print server apparatus receives a print job from the client terminal apparatus and the use state of the designated MFP is the logout state, the print server apparatus sets the use state to "being print" and performs "direct print" in which the print job is transmitted to the designated MFP and is then printed. In this way, even when a print job is received from another client terminal apparatus immediately after a print job is transmitted to the MFP, it is possible to prevent direct print. Therefore, it is possible to improve security.

In the output control system according to this embodiment, when the MFP receives a login input from the user while printing print data, it rejects the login and does not transmit its use state to the print server apparatus. In this way, it is possible to prevent another user from logging in the MFP while the MFP is printing print data. Therefore, it is possible to further improve security.

Fifth Embodiment

In the output control system according to the first embodiment, when receiving a print job from the client terminal apparatus, the print server apparatus determines whether to perform "hold print" in which the print job is stored in the job storage unit and is then printed and "direct print" in which the print job is transmitted to the MFP. In contrast, in an output control system according to this embodiment, when receiving a print job from the client terminal apparatus, the print server apparatus requests the user to select a printing method through the client terminal apparatus. When direct print is selected, the print server apparatus determines whether to perform "hold print" or "direct print".

Since the overall structure of the output control system according to this embodiment is the same as that of the output control system according to the first embodiment, the description thereof will not be repeated (see FIG. 1).

Next, the function structures of a print server apparatus 800, a client terminal apparatus 900, and an MFP 300 forming the output control system according to this embodiment will be described. FIG. 14 is a block diagram illustrating the structure of each apparatus in the output control system according to the fifth embodiment. In this embodiment, since the structure and function of the MFP 300 are the same as those of the MFP according to the first embodiment, the description thereof will not be repeated.

First, the structure of the print server apparatus 800 will be described. The print server apparatus 800 mainly includes a storage unit 150, a job storage unit 107, a use state receiving unit 106, a use state setting unit 105, a job receiving unit 102, a use state acquiring unit 103, a job control unit 804, a job transmitting unit 108, a control result notifying unit 101, and a selection request transmitting unit 809, and a selection result receiving unit 810. In this embodiment, since the use state receiving unit 106, the use state setting unit 105, the job receiving unit 102, the use state acquiring unit 103, the job transmitting unit 108, and the control result notifying unit 101 have the same function and structure as those in the first embodiment, the description thereof will not be repeated.

When the job receiving unit 102 receives a print job from the client terminal apparatus 900, the selection request transmitting unit 809 transmits, to the client terminal apparatus 900, a printing method selection request for the user to select whether to perform "hold print" in which print data is stored in the job storage unit 107 or "direct print" in which print data is transmitted to the designated MFP 700 in response to a print request.

After the selection request transmitting unit 809 transmits the selection request to the client terminal apparatus 900, the selection result receiving unit 810 receives the selection result for the selection request from the client terminal apparatus 900, that is, the result of selecting whether to perform "hold print" or "direct print".

When a print job is received from the client terminal apparatus 900 and the selection result received by the selection result receiving unit 810 indicates that the print data is transmitted to the designated MFP 700, the job control unit 804 determines a print job printing method from the use state acquired by the use state acquiring unit 103. The detailed determination method is the same as that in the first embodiment.

Next, the client terminal apparatus 900 will be described. The client terminal apparatus 900 mainly includes a job transmitting unit 201, a control result receiving unit 202, and a transmitting and receiving unit 903. In this embodiment, since the job transmitting unit 201 and the control result receiving unit 202 have the same structure and function as those in the first embodiment, the description thereof will not be repeated.

After the job transmitting unit 201 transmits a print job to the print server apparatus 800, the transmitting and receiving unit 903 receives, from the client terminal apparatus 900, a printing method selection request for the user to select whether to perform "hold print" or "direct print". Then, the client terminal apparatus 900 allows the user to select a printing method and the transmitting and receiving unit 903 transmits the printing method selected by the user to the print server apparatus 800.

In this embodiment, since the flow of a process of receiving a login input from the user and the flow of a process of received a logout input from the user are the same as those in the first embodiment, the description thereof will not be repeated (see FIGS. 4 and 5).

Figure 15:
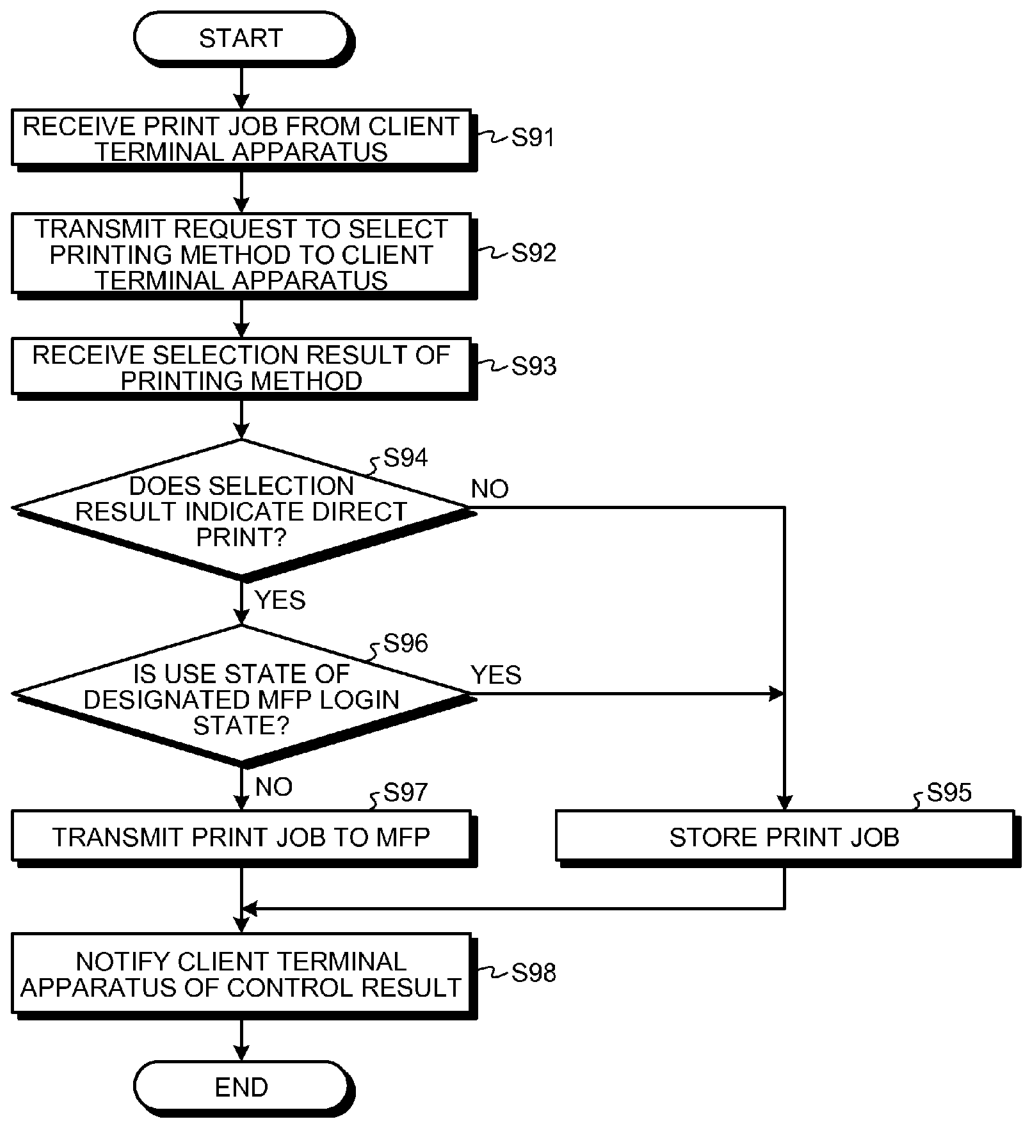
FIG. 15 is a flowchart illustrating the flow of the process of a print server apparatus when a print job is received.

Next, the flow of the process of the print server apparatus 800 when a print job is received from the client terminal apparatus 900 will be described. FIG. 15 is a flowchart illustrating the flow of the process of the print server apparatus when a print job is received. FIG. 15 illustrates a case in which the MFP 300 is selected as an apparatus for printing print data by the user.

First, the job receiving unit 102 receives a print job from the client terminal apparatus 900 (Step S91). Then, the selection request transmitting unit 809 transmits a printing method selection request to the client terminal apparatus 900 (Step S92). Then, the selection result receiving unit 810 receives the selection result for the selection request from the client terminal apparatus 900 (Step S93).

Then, the job control unit 804 determines whether the received selection result indicates direct print (Step S94). When the selection result does not indicate direct print, that is, when hold print is selected (Step S94: No), the job control unit 804 stores the print job in the job storage unit 107 (Step S95).

On the other hand, when the selection result indicates direct print (Step S94: Yes), the job control unit 804 determines whether the use state of the designated MFP 300 is a login state in the print job with reference to the use state information 151 (Step S96). When the use state is the login state (Step S96: Yes), the job control unit 804 stores the print job in the job storage unit 107 (Step S95).

On the other hand, when the use state is not the login state, that is, when the use state is a logout state (Step S96: No), the job control unit 804 transmits the print job to the designated MFP 300 through the job transmitting unit 108 (Step S97). Then, the control result notifying unit 101 notifies the client terminal apparatus 900 of the result of print control by the job control unit 804 as the control result of the print job (Step S98).

As such, in the output control system according to this embodiment, the print server apparatus 800 receives a print job from the client terminal apparatus 900. Then, when the user selects hold print, or when the user selects direct print, but another user logs in the designated MFP 300, the print server apparatus 800 performs "hold print" in which the print job is stored in the job storage unit 107 and is then printed. On the other hand, when the user selects direct print and the use state of the MFP 300 is the logout state, the print server apparatus 800 performs "direct print" in which the print job is transmitted to the designated MFP 300 and is then printed. In this way, when another user is in the login state, print data is not printed. Therefore, it is possible to improve security while maintaining convenience.

In some cases, the user wants to only input a print instruction and pick up the printed matter later even when the designated MFP can perform printing in the logout state. In this case, when the print server apparatus 800 receives a print job from the client terminal apparatus 900, first, the output control system according to this embodiment can receive the printing method selected by the user through the client terminal apparatus 900. Therefore, for example, the client terminal apparatus 900 may include a printer icon for hold print and a printer icon for direct print and the icons may be used to change the printing method between hold print and direct print. In this case, it is possible to simply change the printing method between hold print and direct print and thus further improve convenience.

In the output control system according to each of the first to fifth embodiments, when the user logs out from the MFP or when the printing of print data has been completed, the use state is transmitted from the MFP to the print server apparatus. Then, the print server apparatus updates (sets) the use state information using the use state received from the MFP. However, the print server apparatus may not update the use state information immediately after the use state is received, but may update the use state information after the lapse of a predetermined period of time. This is because the following is considered. For example, the user who is in front of the MFP does not always leave the MFP after printing is completed, or when the MFP receives another printer job immediately after the printing of a print job is completed, the user who is in front of the MFP mistakes the printed matter for his or hers and picks up the printed matter.

Figure 16:
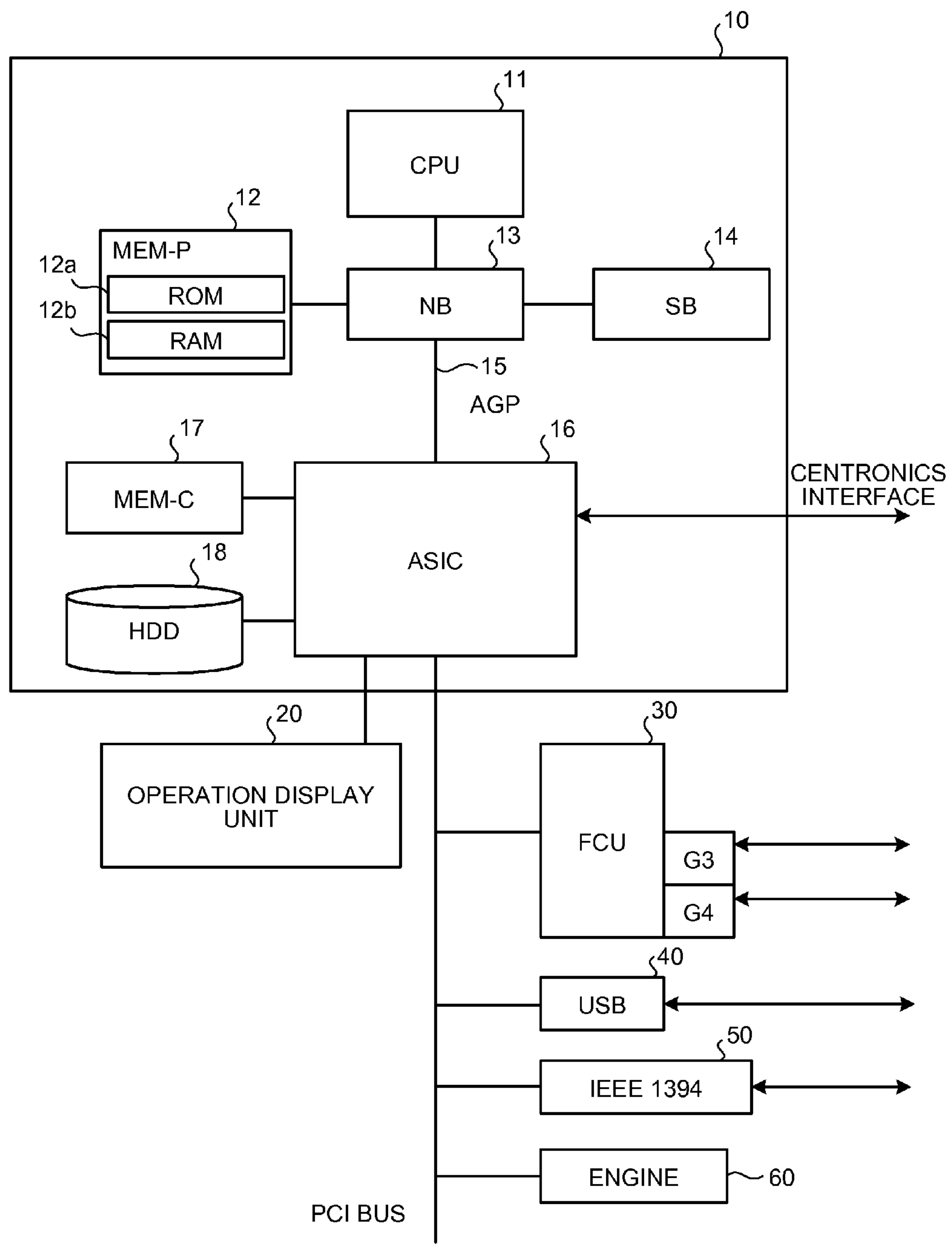
FIG. 16 is a block diagram illustrating the hardware structure of an MFP according to each of the first to fifth embodiments.

Next, the hardware structure of the MFP according to each of the first to fifth embodiments will be described with reference to FIG. 16. FIG. 16 is a block diagram illustrating the hardware structure of the MFP according to each of the first to fifth embodiments. As illustrated in FIG. 16, the MFP 300 or 700 has a structure in which a controller 10 and an engine 60 are connected to each other by a peripheral component interface (PCI) bus. The controller 10 controls the overall operation of the MFP 300 or 700, drawing, communication, and the input of information from an operating unit. The engine 60 is, for example, a printer engine which can be connected to the PCI bus. For example, the engine 60 is a monochrome plotter, a one-drum color plotter, a 4-drum color plotter, a scanner, or a facsimile unit. Furthermore, the engine 60 includes an image processing part such as an error diffusion unit or a gamma conversion unit in addition to a so-called engine unit of a plotter.

The controller 10 includes a central processing unit (CPU) 11, a north bridge (NB) 13, a system memory (MEM-P) 12, a south bridge (SB) 14, a local memory (MEM-C) 17, an application specific integrated circuit (ASIC) 16, and a hard disk drive (HDD) 18. The north bridge (NB) 13 and the ASIC 16 are connected to each other by an accelerated graphics port (AGP) bus 15. In addition, the MEM-P 12 includes a read only memory (ROM) 12*a* and a random access memory (RAM) 12*b*.

The CPU 11 controls the overall operation of the MFP 300 or 700, includes a chipset including the NB 13, the MEM-P 12, and the SB 14, and is connected to another apparatus through the chipset.

The NB 13 is a bridge for connecting the CPU 11 to the MEM-P 12, the SB 14, and the AGP 15 and includes a memory controller that controls the reading and writing of data from and to the MEM-P 12, a PCI master, and an AGP target.

The MEM-P 12 is a system memory which is used as, for example, a memory for storing programs or data, a memory for developing programs or data, or a memory for a printer and includes a ROM 12*a* and a RAM 12*b*. The ROM 12*a* is a read-only memory which is used as a memory for storing programs or data. The RAM 12*b* is a readable/writable memory which is used as, for example, a memory for developing programs or data or a memory for a printer.

The SB 14 is a bridge that connects the NB 13, PCI devices, and peripheral devices. The SB 14 is connected to the NB 13 through the PCI bus. For example, a network interface (I/F) unit is also connected to the PCI bus.

The ASIC 16 is an integrated circuit (IC) for image processing that includes hardware components for image processing and functions as a bridge that connects the AGP 15, the PCI bus, the HDD 18, and the MEM-C 17. The ASIC 16 includes the PCI master, the AGP target, an arbiter (ARB) that forms the core of the ASIC 16, a memory controller that controls the MEM-C 17, a plurality of direct memory access controllers (DMAC) that perform, for example, the rotation of image data using hardware logic, and a PCI unit that transmits data to the engine 60 through the PCI bus. A facsimile control unit (FCU) 30, a universal serial bus (USB) 40, and an IEEE (the Institute of Electrical and Electronics Engineers) 1394 interface 50 are connected to the ASIC 16 through the PCI bus. An operation display unit 20 is directly connected to the ASIC 16.

The MEM-C 17 is a local memory which is used as an image buffer for copying or a code buffer. The HDD 18 is a storage for storing image data, programs, font data, or forms.

The AGP 15 is a bus interface for a graphic accelerator card which is intended to increase the speed of graphic processing. The AGP 15 directly accesses the MEM-P 12 at high throughput to increase the speed of the graphic accelerator card.

A print program which is executed by the MFP 300 or 700 according to this embodiment is incorporated into, for example, a ROM and is then provided.

The print program which is executed by the MFP 300 or 700 according to this embodiment may be recorded as an installable or executable file on a computer-readable storage medium, such as a CD-ROM, a flexible disk (FD), a CD-R, or a digital versatile disk (DVD), and then provided.

In addition, the print program which is executed by the MFP 300 or 700 according to this embodiment may be stored in a computer connected to a network, such as the Internet, downloaded through the network, and then provided. Furthermore, the print program which is executed by the MFP 300 or 700 according to this embodiment may be provided or distributed through the network, such as the Internet.

The print program which is executed by the MFP 300 or 700 according to this embodiment may have a module configuration including the above described components (the use state transmitting unit 301 or 701, the job receiving unit 302, the input receiving unit 303, the login control unit 304 or 704, the output unit 305, and the transmitting and receiving unit 706). In the actual hardware, when the CPU (a processor) reads the print program from the ROM and executes the print program, each of the above-mentioned components is loaded onto a main storage device, and the use state transmitting unit 301 or 701, the job receiving unit 302, the input receiving unit 303, the login control unit 304 or 704, the output unit 305, and the transmitting and receiving unit 706 are generated on the main storage device.

Figure 17:
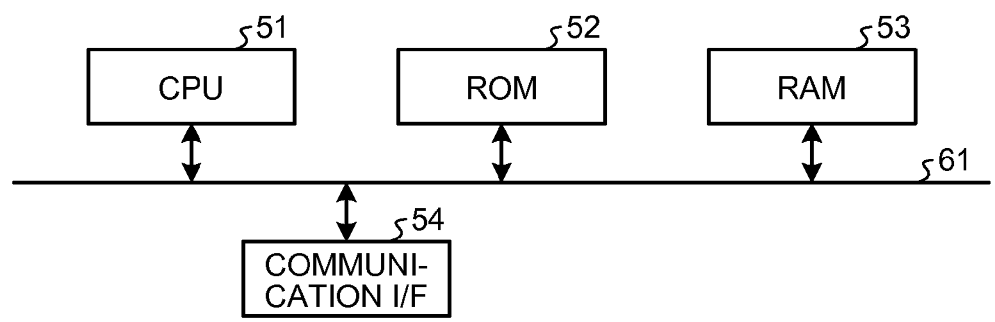
FIG. 17 is a diagram illustrating the hardware structure of the print server apparatus according to each of the first to fifth embodiments.

Next, the hardware structure of the print server apparatus according to each of the first to fifth embodiments will be described with reference to FIG. 17. FIG. 17 is a diagram illustrating the hardware structure of the print server apparatus according to each of the first to fifth embodiments.

Each of the print server apparatuses 100, 400, 600, and 800 according to the first to fifth embodiments includes a control device, such as a CPU 51, a storage device, such as a ROM 52 or a RAM 53, a communication I/F 54 that is connected to a network and communicates with the network, an external storage device, such as an HDD or a compact disc (CD) drive device, a display device, such as a display, an input device, such as a keyboard or a mouse, and a bus 61 that connects the above-mentioned components, and has a hardware structure using a general computer.

An output control program which is executed by each of the print server apparatuses 100, 400, 600, and 800 according to the first to fifth embodiments is recorded as an installable or executable file on a computer-readable storage medium, such as a compact disk read only memory (CD-ROM), a flexible disk (FD), a compact disk recordable (CD-R), or a DVD, and is then provided as a computer program product.

In addition, the output control program which is executed by each of the print server apparatuses 100, 400, 600, and 800 according to the first to fifth embodiments may be stored in a computer connected to a network, such as the Internet, downloaded through the network, and then provided. Furthermore, the output control program which is executed by each of the print server apparatuses 100, 400, 600, and 800 according to the first to fifth embodiments may be provided or distributed through the network, such as the Internet.

The output control program according to each of the first to fifth embodiments may be incorporated into, for example, a ROM and then provided.

The output control program which is executed by each of the print server apparatuses 100, 400, 600, and 800 according to the first to fifth embodiments has a module configuration including the above-mentioned units (the control result notifying unit 101, the job receiving unit 102, the use state acquiring unit 103, the job control unit 104, 404, or 804, the use state setting unit 105 or 605, the use state receiving unit 106, the job transmitting unit 108 or 408, the list information transmitting unit 409, the selected apparatus receiving unit 410, the inquiry transmitting unit 609, the response receiving unit 610, the selection request transmitting unit 809, and the selection result receiving unit 810. In the actual hardware, when the CPU (processor) 51 reads the output control program from the storage medium and executes the output control program, each of the above-mentioned units is loaded onto the main storage device and each of the above-mentioned units is generated on the main memory device.

In the first to fifth embodiments of the invention, the output apparatus is a multifunction printer (MFP) having at least two of a copy function, a printer function, a scanner function, and a facsimile function. However, the invention can be applied to any image forming apparatus such as a copying machine, a printer, a scanner, and a facsimile machine.

In the first to fifth embodiments, the MFP, which is an output apparatus, and the print server apparatus, which is an output control apparatus, are separately provided. However, the MFP and the print server apparatus may be integrated into one apparatus (that is, the MFP may have a function of storing print data).

According to the embodiments, it is possible to improve security while maintaining convenience.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

Note 1

An output apparatus connected to an output control apparatus that controls output of output target data through a network, includes an input receiving unit configured to receive the input of unique user identification information about a user; an authority control unit configured to control the authority of the user to use the output apparatus on the basis of the received user identification information; an output unit configured to output the output target data; and a state transmitting unit configured to transmit a use state of the output apparatus to the output control apparatus. When the use state indicates that the output target data is being output, the authority control unit does not give the use authority to the user who inputs the user identification information. When the use state indicates that the output target data is being output and the use authority is not given to the user who inputs the user identification information, the state transmitting unit does not transmit the use state to the output control apparatus.

Note 2

A non-transitory computer-readable storage medium includes an executable program stored thereon. The program instructs a computer of an output control system to perform an output control method. The output control system includes an output apparatus and an output control apparatus connected to the output apparatus through a network. The output control apparatus includes a state information storage unit configured to store therein state information in which unique apparatus identification information about the output apparatus and a use state of the output apparatus are associated with each other, and a data storage unit configured to store therein target data to be output by the output apparatus. The output control method includes transmitting the use state from the output apparatus to the output control apparatus; receiving the use state from the output apparatus; storing the state information in which the received use state and the apparatus identification information are associated with each other in the state information storage unit; receiving, by the output control apparatus, the target data, a designation of the output apparatus that is an output destination, and a request to output the target data to the designated output apparatus from a terminal apparatus; determining, by the output control apparatus, whether to store the target data in the data storage unit or transmit the target data to the designated output apparatus in response to the request, on the basis of the use state corresponding to the apparatus identification information about the designated output apparatus with reference to the state information; and transmitting the target data and the request to the designated output apparatus when it is determined that the target data is to be transmitted to the designated output apparatus. The target data is stored in the data storage unit when it is determined that the target data is to be stored in the data storage unit.

What is claimed is:

1. An output control system comprising:

an output apparatus; and an output control apparatus connected to the output apparatus through a network, wherein the output apparatus includes an output unit configured to output target data; and a state transmitting unit configured to transmit a use state of the output apparatus to the output control apparatus, the output control apparatus includes a state information storage unit configured to store therein state information in which unique apparatus identification information about the output apparatus and the use state are associated with each other;

a data storage unit configured to store therein the target data;

a use state management unit configured to receive the use state from the output apparatus and store the state information in which the received use state and the apparatus identification information are associated with each other in the state information storage unit;

a data receiving unit configured to receive the target data, a designation of the output apparatus that is an output destination, and a request to output the target data to the designated output apparatus from a terminal apparatus;

an output control unit configured to determine whether to store the target data received by the data receiving unit in the data storage unit or transmit the target data received by the data receiving unit to the designated output apparatus in response to the request, on the basis of whether or not the use state corresponding to the apparatus identification information about the designated output apparatus with reference to the state information is a state in which use authority is already given; and a data transmitting unit configured to transmit the target data and the request to the designated output apparatus when it is determined that the target data is to be transmitted to the designated output apparatus, and the output control unit stores the target data in the data storage unit when it is determined that the target data is to be stored in the data storage unit.

2. The output control system according to claim 1, wherein when the use state of the designated output apparatus is a state in which the use authority is already given, the output control unit determines whether there is another output apparatus to which the use authority is not given with reference to the state information, the output control apparatus includes a list information transmitting unit configured to, when there is another output apparatus to which the use authority is not given, transmit information about a list of other apparatuses to which the use authority is not given to the terminal apparatus; and a selected apparatus receiving unit configured to receive information about one of the other output apparatuses which is selected by a user from the terminal apparatus, and the data transmitting unit transmits the target data to the selected output apparatus in response to the request.

3. The output control system according to claim 1, wherein, when the use state of the output apparatus is changed, the state transmitting unit transmits the changed use state to the output control apparatus.

4. The output control system according to claim 3, wherein, when the use state of the output apparatus is changed from a state in which the use authority is already given to a state in which the use authority is not given and when the output of the target data by the output unit is completed, the state transmitting unit transmits the use state indicating that the use authority is not given to the output apparatus to the output control apparatus.

5. The output control system according to claim 1, wherein, when the target data is transmitted to the designated output apparatus in response to the request, the use state management unit stores, in the state information storage unit, the state information in which the use state indicating that the output apparatus is outputting data and the apparatus identification information about the designated output apparatus are associated with each other.

6. The output control system according to claim 5, wherein the output control apparatus further includes an inquiry transmitting unit configured to transmit an inquiry about the use state to the designated output apparatus after the target data is transmitted to the designated output apparatus in response to the request; and a response receiving unit configured to receive a response to the inquiry from the designated output apparatus, and when the response indicating that the output is completed is received from the designated output apparatus, the use state management unit stores, in the state information storage unit, the state information in which the use state indicating that the use authority is not given to the output apparatus and the apparatus identification information about the designated output apparatus are associated with each other.

7. The output control system according to claim 5, wherein the output apparatus further includes an input receiving unit configured to receive input of unique user identification information about a user; and an authority control unit configured to control the use authority of the user to use the output apparatus on the basis of the received user identification information, when the use state indicates that the target data is being output, the authority control unit does not give the use authority to the user who inputs the user identification information, and when the use state indicates that the target data is being output and when the use authority is not given to the user who inputs the user identification information, the state transmitting unit does not transmit the use state to the output control apparatus.

8. The output control system according to claim 1, wherein the output control apparatus further includes a selection request transmitting unit configured to transmit, to the terminal apparatus, a request for the user to select whether to store the target data in the data storage unit or transmit the target data to the designated output apparatus in response to the request to output the target data; and a selection result receiving unit configured to receive a selection result for the request to select from the terminal apparatus, when the selection result indicates that the target data is to be transmitted to the designated output apparatus, the output control unit determines whether to store the target data in the data storage unit or transmit the target data to the designated output apparatus in response to the request to output on the basis of the use state corresponding to the apparatus identification information about the designated output apparatus with reference to the state information.

9. The output control system according to claim 1, wherein, when the use state of the designated output apparatus is a state in which the use authority is not given, the output control unit determines that the target data is to be transmitted to the designated output apparatus in response to the request to output.

10. The output control system according to claim 9, wherein when the use state of the designated output apparatus is a state in which the use authority is already given, the output control unit determines whether there is another output apparatus to which the use authority is not given with reference to the state information, the output control apparatus includes a list information transmitting unit configured to, when there is another output apparatus to which the use authority is not given, transmit information about a list of other apparatuses to which the use authority is not given to the terminal apparatus; and a selected apparatus receiving unit configured to receive information about one of the other output apparatuses which is selected by a user from the terminal apparatus, and the data transmitting unit transmits the target data to the selected output apparatus in response to the request.

11. The output control system according to claim 9, wherein, when the use state of the output apparatus is changed, the state transmitting unit transmits the changed use state to the output control apparatus.

12. The output control system according to claim 11, wherein, when the use state of the output apparatus is changed from a state in which the use authority is already given to a state in which the use authority is not given and when the output of the target data by the output unit is completed, the state transmitting unit transmits the use state indicating that the use authority is not given to the output apparatus to the output control apparatus.

13. The output control system according to claim 9, wherein, when the target data is transmitted to the designated output apparatus in response to the request, the use state management unit stores, in the state information storage unit, the state information in which the use state indicating that the output apparatus is outputting data and the apparatus identification information about the designated output apparatus are associated with each other.

14. The output control system according to claim 13, wherein the output control apparatus further includes an inquiry transmitting unit configured to transmit an inquiry about the use state to the designated output apparatus after the target data is transmitted to the designated output apparatus in response to the request; and a response receiving unit configured to receive a response to the inquiry from the designated output apparatus, and when the response indicating that the output is completed is received from the designated output apparatus, the use state management unit stores, in the state information storage unit, the state information in which the use state indicating that the use authority is not given to the output apparatus and the apparatus identification information about the designated output apparatus are associated with each other.

15. The output control system according to claim 9, wherein the output apparatus further includes an input receiving unit configured to receive input of unique user identification information about a user; and an authority control unit configured to control the use authority of the user to use the output apparatus on the basis of the received user identification information, when the use state indicates that the target data is being output, the authority control unit does not give the use authority to the user who inputs the user identification information, and when the use state indicates that the target data is being output and when the use authority is not given to the user who inputs the user identification information, the state transmitting unit does not transmit the use state to the output control apparatus.

16. The output control system according to claim 9, wherein the output control apparatus further includes a selection request transmitting unit configured to transmit, to the terminal apparatus, a request for the user to select whether to store the target data in the data storage unit or transmit the target data to the designated output apparatus in response to the request to output the target data; and a selection result receiving unit configured to receive a selection result for the request to select from the terminal apparatus, when the selection result indicates that the target data is to be transmitted to the designated output apparatus, the output control unit determines whether to store the target data in the data storage unit or transmit the target data to the designated output apparatus in response to the request to output on the basis of the use state corresponding to the apparatus identification information about the designated output apparatus with reference to the state information.

17. The output control system according to claim 1, wherein the state information includes the output apparatus name, an update time of when the output apparatus is updated, whether a user is logged in to the output apparatus, and a user name of a user logged in to the output apparatus.

18. An output control method performed in an output control system that includes an output apparatus and an output control apparatus connected to the output apparatus through a network, the output control apparatus including a state information storage unit configured to store therein state information in which unique apparatus identification information about the output apparatus and a use state of the output apparatus are associated with each other, and a data storage unit configured to store therein target data to be output by the output apparatus, the output control method comprising:

transmitting the use state from the output apparatus to the output control apparatus;

receiving the use state from the output apparatus;

storing the state information in which the received use state and the apparatus identification information are associated with each other in the state information storage unit;

receiving, by the output control apparatus, the target data, a designation of the output apparatus that is an output destination, and a request to output the target data to the designated output apparatus from a terminal apparatus;

determining, by the output control apparatus, whether to store the target data in the data storage unit or transmit the target data to the designated output apparatus in response to the request, on the basis of whether or not the use state corresponding to the apparatus identification information about the designated output apparatus with reference to the state information is a state in which use authority is already given; and transmitting the target data and the request to the designated output apparatus when it is determined that the target data is to be transmitted to the designated output apparatus, wherein the target data is stored in the data storage unit when it is determined that the target data is to be stored in the data storage unit.

19. An output control apparatus connected to an output apparatus that outputs target data through a network, the output control apparatus comprising:

a state information storage unit configured to store therein state information in which unique apparatus identification information about the output apparatus and the use state are associated with each other;

a data storage unit configured to store therein the target data;

a use state management unit configured to receive the use state from the output apparatus and store the state information in which the received use state and the apparatus identification information are associated with each other in the state information storage unit;

a data receiving unit configured to receive the target data, a designation of the output apparatus that is an output destination, and a request to output the target data to the designated output apparatus from a terminal apparatus;

an output control unit configured to determine whether to store the target data received by the data receiving unit in the data storage unit or transmit the target data received by the data receiving unit to the designated output apparatus in response to the request, on the basis of whether or not the use state corresponding to the apparatus identification information about the designated output apparatus with reference to the state information is a state in which use authority is already given; and a data transmitting unit configured to transmit the target data and the request to the designated output apparatus when it is determined that the target data is to be transmitted to the designated output apparatus, wherein the output control unit stores the target data in the data storage unit when it is determined that the target data is to be stored in the data storage unit.

* * * * *